(12) United States Patent
Parihar et al.

(10) Patent No.: US 9,914,104 B2
(45) Date of Patent: Mar. 13, 2018

(54) METHODS AND APPARATUS FOR THREE PHASE CONTACTING AND REACTIONS IN A CROSS FLOW REACTOR

(71) Applicant: BHARAT PETROLEUM CORPORATION LIMITED, Mumbai (IN)

(72) Inventors: Prashant Udaysinh Parihar, Uttar Pradesh (IN); RaviKumar Voolapalli, Uttar Pradesh (IN); Srinivasulu Kaalva, Uttar Pradesh (IN)

(73) Assignee: BHARAT PETROLEUM CORPORATION LIMITED, Mumbai (IN)

( * ) Notice: Subject to any disclaimer, the term of this patent is extended or adjusted under 35 U.S.C. 154(b) by 19 days.

(21) Appl. No.: 14/421,277

(22) PCT Filed: Apr. 15, 2014

(86) PCT No.: PCT/IB2014/000548
§ 371 (c)(1),
(2) Date: Feb. 12, 2015

(87) PCT Pub. No.: WO2014/188243
PCT Pub. Date: Nov. 27, 2014

(65) Prior Publication Data
US 2016/0136603 A1 May 19, 2016

(30) Foreign Application Priority Data

May 21, 2013 (IN) .................. 1805/MUM/2013

(51) Int. Cl.
*C10G 45/00* (2006.01)
*C10G 45/02* (2006.01)
(Continued)

(52) U.S. Cl.
CPC ............ *B01J 8/0257* (2013.01); *B01J 8/0214* (2013.01); *B01J 8/0278* (2013.01); *B01J 8/0415* (2013.01);
(Continued)

(58) Field of Classification Search
CPC ...... B01J 8/0257; B01J 8/0278; B01J 8/0469; B01J 8/0492; C10G 45/00; C10G 45/02; C10G 47/00
See application file for complete search history.

(56) References Cited

U.S. PATENT DOCUMENTS 2,646,391 A 7/1953 Houdry
6,467,758 B1 * 10/2002 Filippi ................ B01D 3/16
261/128

FOREIGN PATENT DOCUMENTS

EP 0940172 A1 * 9/1999 .............. B01D 3/16
EP 1277701 A2 1/2003
EP 2607301 A1 6/2013

OTHER PUBLICATIONS

Search Report for International Patent Application No. PCT/IB2014/000548; dated Oct. 20, 2014.

* cited by examiner

*Primary Examiner* — Randy Boyer
(74) *Attorney, Agent, or Firm* — Barnes & Thornburg LLP

(57) ABSTRACT

Methods, apparatus and processes for three phase contacting and reactions in a cross flow reactor with reduced feed vaporization, low pressure operation, higher liquid holdup, lower reactor pressure drop, low severity operation, and reduced product inhibitory effects. A cross flow reactor for three phase catalytic hydroprocessing, having at least one reactor stage is disclosed. The reactor stage has a central gas distributor with perforated lateral surface for distributing (Continued)

gas, a middle region accommodating a packed catalyst bed, and an outer gas space for removal of effluent gases from the middle region. The middle region receives a liquid reactant and gas from central gas distributor to carry out three phase catalytic hydroprocessing reaction.

19 Claims, 19 Drawing Sheets

(51) Int. Cl.
*C10G 47/00* (2006.01)
*B01J 8/02* (2006.01)
*B01J 8/04* (2006.01)
*C10G 49/00* (2006.01)

(52) U.S. Cl.
CPC ........... *B01J 8/0469* (2013.01); *B01J 8/0492* (2013.01); *C10G 45/00* (2013.01); *C10G 45/02* (2013.01); *C10G 47/00* (2013.01); *C10G 49/002* (2013.01); *B01J 2208/00274* (2013.01); *B01J 2208/00884* (2013.01); *B01J 2208/027* (2013.01)

METHODS AND APPARATUS FOR THREE PHASE CONTACTING AND REACTIONS IN A CROSS FLOW REACTOR

PRIORITY CLAIM

This patent application is a U.S. National Phase of International Patent Application No. PCT/IB2014/000548, filed 15 Apr. 2014, which claims priority to Indian Patent Application No. 1805/MUM/2013, filed 21 May 2013, the disclosures of which are incorporated herein by reference in their entirety.

FIELD OF INVENTION

The present invention, in general, relates to three-phase reactors and processes for refining hydrocarbons, and in particular, relates to three-phase cross flow reactors.

BACKGROUND

Gas-liquid-solid catalytic reactors, also called three-phase reactors, are widely used in various industries, such as refining, chemical, and petrochemical industries, to carry out various reactions. In refining gas liquid three phase reactors are used for hydroprocessing of hydrocarbon feedstock. Hydrocarbon feedstock is generally available as crude oil, which includes various petroleum fractions like gasoline, kerosene, diesel, wax, and heavy oils, along with unsaturated hydrocarbon compounds, such as olefins and aromatics, and hetero atom impurities, such as sulphur, nitrogen, etc. The hydrocarbon feedstock has to be hydroprocessed to a suitable quality for production of various petroleum products. For example, long chain hydrocarbons in heavy oils have to be broken down into smaller chain hydrocarbons, the impurities have to be removed and the unsaturated compounds have to be saturated. Such reactions are carried out using the three-phase reactors.

These reactors can be operated in co-current or counter-current mode. If the reactor is designed in such a way that the reactants flow in the same direction within the reactor, it is termed as a co-current three-phase reactor. When the direction of flow of reactants is opposite to each other in the reactor, it is known as counter-current three-phase reactor.

The three-phase packed bed reactors, also referred to as trickle bed reactors, are commonly used for hydroprocessing. Hydroprocessing is a highly exothermic process involving treatment of hydrocarbon feedstock with hydrogen in the presence of a suitable catalyst to achieve various objectives like desulphurization, denitrogenation, hydrogenation, hydrocracking, and isomerization for production of fuels and lubes of desired quality. It is generally carried out in adiabatic mode with intermediate quenching to check the rise in temperature due to the exothermic nature of the reactions. In hydroprocessing, hydrogen react with hetero atoms to produce gases like hydrogen sulphide and ammonia, thereby removing the hetero atoms from the hydrocarbon feedstock. Further, the treatment with hydrogen also results in hydrogenation of unsaturated hydrocarbon molecules and hydrocracking of long chain molecules.

Conventionally, hydroprocessing of hydrocarbon feedstock is done in three-phase packed bed reactor with co-current down flow mode of operation at elevated pressure and temperature. In the conventional co-current down flow hydroprocessing, high gas to oil ratio is used, and thus, gas phase is continuous phase and liquid is dispersed. Consequently, it leads to undesired vaporization of hydrocarbon feed during hydroprocessing of hydrocarbon feedstock. In addition, higher gas/oil ratio leads to increased pressure drop across the reactor, and thus, a high pressure differential within the reactor. Further, the co-current reactors have a high mean flow path for the reactant gas, which leads to additional pressure drop along the length of the reactor and significant difference in pressure of the reactor at the entrance and exit.

On the other hand, as the hydroprocessing reactions proceed within the reactor, more and more of hydrogen sulphide ($H_2S$) and ammonia ($NH_3$) are generated. As a result, there is increase in the concentration of $H_2S$ and $NH_3$, and thus, the partial pressure of hydrogen is reduced. The reduced partial pressure of hydrogen leads to reduced rate of desulphurization, denitrogenation, and saturation reactions in the reactor. This often leads to high severity operation to meet product quality specifications, in turn causing nonselective cracking of hydrocarbon feedstock to light ends and shorter run lengths due to increased catalyst deactivation rates.

Further, gas phase holdup increases continuously from reactor entrance to exit as gas phase hydroprocessing products are generated. This results in inefficient utilization and insufficient wetting of catalyst by liquid phase reactant and higher catalyst requirement for given through put and desired product quality and yields. In addition, these units are energy intensive and part of this energy is unnecessarily utilized for vaporization of feed as reactant gas and feed are heated together in reactor feed furnace.

On the other hand, in counter-current packed bed reactors, the reactors are designed in such a way that the gas and liquid reactants are introduced from vertically opposite ends of the reactor into the reactor column and flow in opposite directions. Counter current reactors facilitate ultra-low sulphur levels to be achieved efficiently while treating hydrocarbon feedstock since, during operation; a major part of the middle region is in an $H_2S$ lean environment. However, these reactors also have high differential pressure and a limited range of gas-liquid flow rates under which they can operate without flooding. Flooding typically occurs when the flow rate and pressure of the gas phase is high enough to prevent the downward flow of the liquid phase. Due to flooding, the gas tends to lift the liquid out of bed and there is poor contact between the two phases. As a result, the reactors have to be operated at lower flow rates, which make them commercially unviable. Counter-current hydroprocessing has not achieved commercial acceptability as the drawbacks associated outweigh the benefits.

Further, in both co-current and counter-current reactors, dry spots are created in the middle region during operation due to uneven distribution of feed, feed vaporization, and higher gas holdup. Dry spot is a region in the middle region where the catalyst is devoid of liquid hydrocarbon feed and so cannot participate in the reaction. The occurrence of dry spots leads to under utilization of catalyst in the reactors, which can be significant on an industrial scale. Thus, in both counter-current and co-current reactors, a part of the hydrocarbon feed is either wasted or incompletely processed. To ensure the required quality of treated hydrocarbon, the output stream has to be hydroprocessed again in multiple stages to overcome thermodynamic equilibrium, which increases the cost of operation.

To overcome some of these difficulties, state-of-the-art trickle bed reactors are being designed with inter bed separators for removal of inhibitory compounds, multi stage operation with temperature control and catalysts to overcome equilibrium limitations and maximizing intermediates, efficient gas liquid distributors and internals for improved gas liquid distribution and catalyst wetting. In similar lines, hybrid contacting pattern along with inter-stage separators were described in prior art to address inhibition effects during desulfurization and separation of light ends formed during cracking before passing feed to next stage/reactor.

A third type of reactor, called radial flow or cross flow reactor has been proposed in the art to overcome some of the disadvantages of the counter-current and co-current reactors. In the radial reactor, the liquid and the gas streams flow in radial direction. Radial flow reactors are commercially used for applications such as naphtha reforming process, ammonia synthesis, ethyl benzene dehydrogenation etc. While theoretically such reactors have reduced pressure drops, the commercial use of such reactors is limited to high throughput application and low pressure drop requirements.

Recent technologies advocate liquid phase hydroprocessing wherein the liquid is pre-saturated with hydrogen and hydroprocessing is carried out in absence of gas phase in the reactor. The advantages suggested are near isothermal conditions in the reactor and avoiding gas compression and gas recycle. However, as the solubility of hydrogen is limited good amount of product needs to be recycled for carrying the soluble hydrogen. The liquid recycle requirement for hydrogen intensive applications such as cracking and treating of high sulfur feedstocks is expected to be still higher. Further the inhibitory effects of $NH_3$ and $H_2S$ are expected to be similar to conventional trickle bed reactors.

Therefore it is desirable to have improved multiphase reactor design which overcomes shortcomings of prior art and enables low severity operation, minimizes feed vaporization and non selective cracking, enhances reaction rates for desired reactions, minimizes reactor pressure drop and reactant gas consumption. Thus, there remains a considerable need for apparatus and methods for efficient hydroprocessing of hydrocarbons.

SUMMARY

This summary is provided to introduce concepts related to methods and apparatus for three phase contacting and reactions in a cross flow reactor, which are further described below in the detailed description. This summary is not intended to identify essential features of the claimed subject matter nor is it intended for use in determining or limiting the scope of the claimed subject matter.

Different embodiments of the present subject matter, apparatus and processes for three phase contacting and reactions in a cross flow reactor with reduced feed vaporization, low pressure operation, higher liquid holdup, lower reactor pressure drop, low severity operation, and reduced product inhibitory effects are described. In accordance to one embodiment of the present subject matter, a cross flow reactor for three phase catalytic hydroprocessing, comprises at least one reactor stage. The at least one reactor stage has a central gas distributor having perforations on a lateral surface for distributing reactant gas into the cross-flow reactor. The at least one reactor stage further comprises a middle region, concentric to central gas distributor for accommodating a packed catalyst bed. The reactor stage further comprises an outer gas space for movement of effluent gases from the middle region, concentric to the middle region.

BRIEF DESCRIPTION OF DRAWINGS

The detailed description is provided with reference to the accompanying figures. In the figures, the left-most digit(s) of a reference number identifies the figure in which the reference number first appears. The same numbers are used throughout the drawings to reference like features and components.

DETAILED DESCRIPTION

Figure 1A:
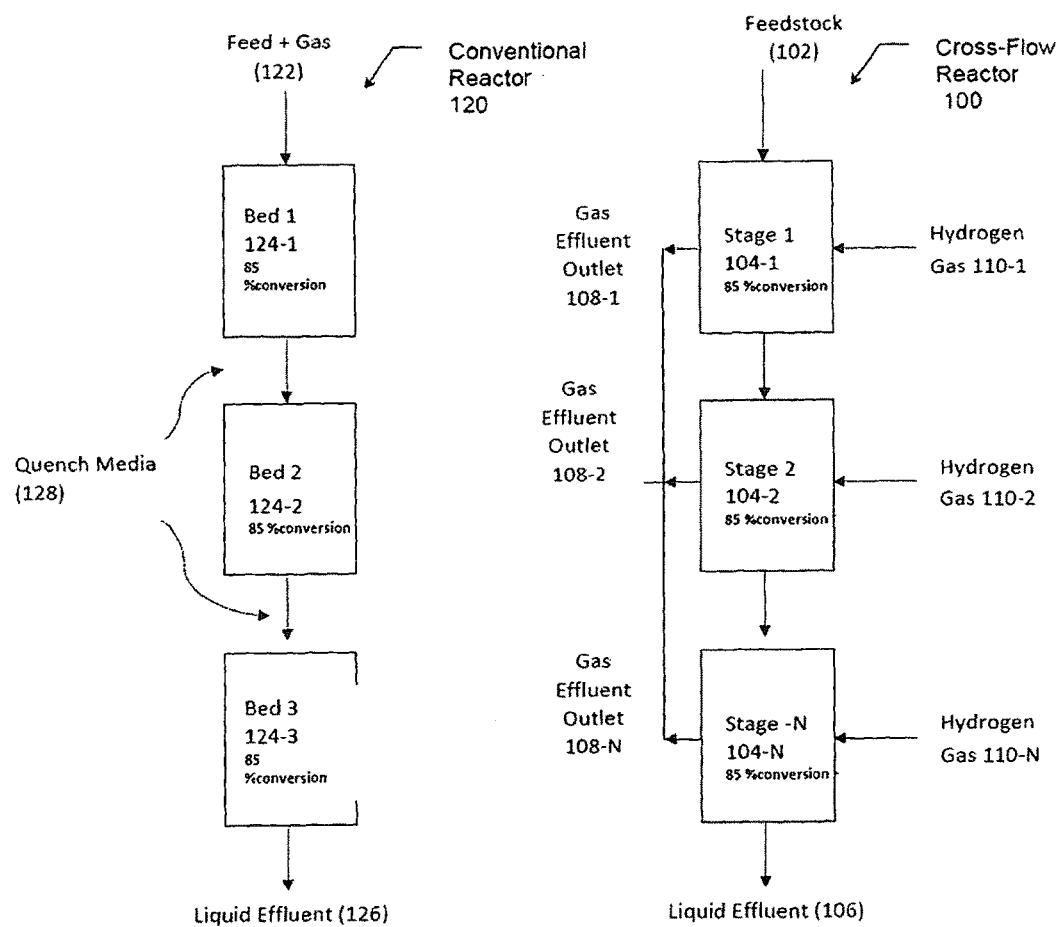
FIG. 1A is a comparative block diagram illustration of a conventional co-current reactor and a cross-flow reactor, according to one embodiment of the present subject matter

In accordance with the present subject matter, method and apparatus for three-phase contacting and reactions in a cross flow reactor is described. In particular, cross-flow reactors and methods of hydroprocessing are described. As would be understood by a person skilled in the art, the cross-flow reactors and the methods described herein can be implemented for hydrocracking, desulphurization, denitrogenation, hydrogenation, hydrotreating, petrochemical product synthesis, and other similar three-phase catalytic/non catalytic processes.

In one embodiment, a cross-flow reactor is formed by internally dividing the reactor into concentric zones forming an inner central gas distributor, a middle region accommodating packed catalyst bed, hereinafter may be referred to as middle region, and an outer gas space. The central gas distributor has perforations distributed over the plates to allow reactant gas to flow out radially from the central gas distributor. In one embodiment, the cross section of perforations on the lateral surface of central gas distributor may be circular, triangular, rectangular, square, star shaped and like. In another embodiment, gas distribution into the catalyst bed can be manipulated by varying perforation size and density, catalyst size and shape and radial flow path for gas. Similarly, the support plates of the middle region have perforations to allow product gases and unreacted reactant gas to flow out radially from the middle region. The central gas distributor and the outer gas space are closed at the bottom to maintain sufficient pressure for flow of gases along the radial direction of the cross-flow reactor, thereby causing the gases to flow from the central gas distributor, through the middle region and to the outer gas space. Each reactor stage or module thus formed contains catalyst having desired functionality and objective to be fulfilled. Person skilled in the art can deduce relative sizing of such modules/reactor stages within reactor vessel to achieve product yield and quality objectives. Modular approach would result in easy implementation of gas liquid cross flow contacting. The cross-flow reactor is also referred to as reactor interchangeably hereafter.

In one implementation, reactant hydrogen gas is introduced into the central gas distributor in the reactor from near the vertical top-end of the reactor. In another implementation, reactant gas is introduced into the central gas distributor in the reactor from near the bottom end of the reactor. In one embodiment, the central gas distributor may be cylindrical in shape. In another implementation, the central gas distributor has polygonal cross section. In one implementation it has either of hexagonal, cubical, or elliptical cross section to provide higher lateral surface area per unit of distributor volume.

In one embodiment, the gas distributor has slit type perforations to distribute the gases into the reactor. The slit type central gas distributor comprises at least one slit on the lateral surface of the central gas distributor. The slit has vertical edge at less than 90° to produce swirling flow of gas into the catalyst bed, thus increasing, the mean flow path and residence time of gas phase. In one embodiment the slits may have guiding vanes attached separately or carved out from the lateral surface to produce the swirling flow.

As mentioned above, radial flow of reactant gas from the central gas distributor to the middle region is facilitated by the perforations in the surface of support plates of the central gas distributor. In one embodiment the perforation are at an angle less than 90°. The perforation at less than 90° provides swirling flow to the gases and increases its mean flow path and residence time in the reactor. The middle region is a packed bed of catalyst particles, which may be of different shapes and sizes based on the reaction requirements and hydrodynamics. For example, in one implementation, the middle region can be packed with spherical catalyst particle of varying size to provide maximum surface area/volume of middle region. In another implementation, the middle region may be packed with cylindrical catalyst pellets to reduce the pressure differential across the middle region. The catalyst packed bed forms the site of hydroprocessing reaction.

Further, hydrocarbon liquid reactant is introduced from the top over the middle region. Any liquid distributor known in the art may be used to spray the liquid hydrocarbon feedstock over the middle region. The catalyst particles in the middle region are wetted by the liquid hydrocarbon as it flows from the top to the bottom of the reactor. The wet catalyst particles come in contact with the reactant gas that flows in the radial direction from the central gas distributor to the middle region. This leads to the hydroprocessing reaction, like hydrogenation, desulphurization, denitrogenation and hydrocracking in the middle region. These reactions lead to generation of gases like hydrogen sulphide and ammonia in the middle region of the reactor and generate heat.

The product gases and the unreacted reactant gas continue to flow along the radial direction towards the outer gas space due to pressure difference between the middle region and the outer gas space. From the outer gas space, the gases are removed and any entrained liquid is separated and may be re-introduced into the reactor. The gases are sent to a separator to recover unreacted hydrogen and lighter hydrocarbon products that have vaporized. Furthermore, the liquid hydrocarbon taken out from the bottom of the middle region is separated into various product fractions. A part of the product fraction may also be recycled into the reactor at a suitable recycle ratio in order to avoid coking reactions at the top by boosting hydrogen availability, as will be understood by a person skilled in the art.

Thus, product gases are continuously removed from the middle region and product inhibition effects are minimized. In addition, the introduction of hydrogen gas into the middle region from the central gas distributor along the length of the reactor facilitates in maintaining high partial pressure of hydrogen in the middle region, thereby increasing reaction rate. Further, along with the effluent gases, some of the heat that is generated by the reactions is also removed. Thus, reaction temperature in the middle region is controlled. Additionally, as the mean flow path of gases along the reactor is significantly lower than co-current or counter current reactors, the pressure drop is further reduced.

In one embodiment, the reactor can be divided into a number of stages one above the other. Each stage can comprise an outlet from the outer gas space for facilitating the removal of product and unreacted gases from that stage. The stages can be separated by an annular support plate, thus creating a dedicated vapor space for each stage. Further, redistributors are provided at the top and bottom of the middle region of each stage to allow the liquid hydrocarbon to pass through from one stage to the next but not the catalyst particles. The re-distributor structure comprises of a central gas passage zone which connects the central gas distributor of stages in series. The liquid re-distributor has provisions to introduce recycle effluent saturated with hydrogen back to the top of catalyst bed in the reactor stage. Thus, the liquid hydrocarbons flow from one stage to the next and are removed from the bottom of the middle region of the last stage, fractionated and partially recycled as mentioned earlier. As the hydrocarbons flow from one stage to the next, a part of the hydrocarbon may also be recycled to the previous stage with a suitable recycle ratio, as will be understood by a person skilled in the art. In one implementation, the reactor is divided into three stages.

The use of multiple reactor stages with dedicated vapor effluent space facilitates the removal of effluent gases at different lengths along the reactor. This helps in reduction of product inhibition. Effluent gas from each reactor stage has distinct composition and person skilled in the art can devise strategy for hydrogen recycle and sour gas treatment accordingly. Moreover, the middle region temperature is effectively controlled by balancing heat release in each stage with reactant gas supply at sufficiently lower temperature. Hence, it significantly reduces liquid vaporization and cracking of the hydrocarbon feedstock to light ends during treatment by reducing reaction temperature rise in each stage, thus maintaining a near isothermal operation. Moreover, since hydrogen gas is introduced at each stage through the central gas distributor, this also helps to maintain sufficient partial pressure of hydrogen along the middle region for hydroprocessing in each stage of the reactor. Moreover, liquid holdup in each stage increases as vapor phase products are no longer competing for catalyst bed volume.

Further, the distribution of perforations on the supporting plates of the central gas distributor and the middle region is selected depending on the reaction extent and hydrogen requirements in each stage. In another example, the distribution of perforations at the top of a stage is denser than at the bottom. In one implementation, catalyst shape and size is selected such that top stages have higher interstitial voidage than latter. In another implementation, the central gas distributor comprises of baffles attached to the inner surface of the support plates to deflect the flow of gas in an oblique-radial direction. The oblique flow of gas reduces the problem of dry spot by avoiding the stripping off of hydrocarbon feed from surface of catalyst particles and entrainment due to high flow rate of reactant gas.

In one embodiment, the upper diameter of the central gas distributor gradually decreases to a lower diameter from top to bottom giving it a shape of tapered cylindrical structure. The tapered structure helps in maintaining sufficient radial pressure profile along the length of the reactor in radial direction, thus enabling higher gas flow in top zone. In one implementation, the upper diameter of the central gas distributor increases gradually down the length from top to bottom forming a tapered central gas distributor. Alternatively, the reactor may have stepwise tapered central gas distributor with uniform diameter at each step of the reactor. A person skilled in art would be readily able to determine the ratio of radius based on the radial pressure profile in the reactor.

In one embodiment of the present subject matter, the cross-flow reactor can be used in combination with two different middle region separated from each other by an internal structure to achieve the selective treatment of hydrocarbon feedstock. For example, the hydrocarbon feedstock can be treated first at the upper stage and then retreated again at the lower stage for a desired quality. In one implementation, the fresh reactant gas is entered from a separated lower central gas distributor space wherein the gas flows radially outward to the outer gas space. The effluent through outer gas space radially flows inside the reactor to a separated upper central gas distributor space wherein it gets collected and discharged through an outlet to series of separators and fractionators. In one implementation, the effluent gas collected from effluent space can be recycled at the upper stage after separating light ends and sour gas in a train of gas-liquid separators train In one implementation, the cross-flow reactor can be used in combination with conventional co-current or counter current reactors. For example, in one case, an upper stage in a catalytic reactor operates as a cross-flow reactor in accordance with the present subject matter and a lower stage in the catalytic reactor operates as a conventional reactor. In such a case, the reactor may also have separate inlets of hydrogen gas and hydrocarbon feedstock for the upper stage and the lower stage of the reactor. Such a catalytic reactor may be used to handle different types of hydrocarbon feedstock with suitable catalyst. For example, the upper and lower stage may respectively receive non-refractory and refractory sulphur containing hydrocarbon feedstock. In another case, the cross-flow reactor and the conventional reactor is arranged in series one after the other.

In one implementation, a cross flow reactor comprises multiple gas distributors arranged in predetermined layout. Each of the gas distributors acts as an independent gas distributor for the reactant gas and is connected through a common inlet for reactant gas. In other implementation each gas distributor has independent reactant gas supply, without any common gas inlet. In one implementation the physical structure of the central gas distributor is same as other distributors. For example, gas distributors have identical pores distribution and upper and lower diameter as the central gas distributor. In another implementation, the physical structure may be varied based upon reaction conditions. In one implementation, liquid reactant enters through inlet and trickles down through catalyst bed. The reactant gas enters through the gas inlet into each distributor and is distributed across catalyst bed. The distributed reactant gas reacts with hydrocarbon liquid and vapor phase products along with unreacted gas and is collected in outer gas space through porous outer shell. Treated liquid reactant is discharged through a recycle stream. In one implementation the treated liquid is recycled to a separator for separating the unreacted hydrocarbon. The separated unreacted hydrocarbon can be recycled to the fresh feed in the reactor. Multibranched axisymetric gas distributor arrangement results in uniform gas distribution and assists in temperature control of exothermic hydroprocessing reactions. In another implementation multiple gas distributor are not symmetrically placed within the reactor vessel. In one implementation gas distributors in multi distributor configuration can have any of the perforation patterns like perforations on one side of axis (180° arc), perforations on either side of axis in alternate manner, along the distributor height. A person skilled in the art will readily be able to determine number of such distributors required and perforation pattern to be followed in order to achieve product yield and quality requirements.

In one implementation, hydroprocessing of hydrocarbon feedstock is carried out in cross-flow reactor operating at a temperature between 310 to 410° C., pressure between 15 psi to 2500 psi, gas to oil ratio between 10 to 800 Nm3/m3 and liquid hourly space velocity is preferably between from 0.5 hr-1 to 10 hr-1, in order to get desired product yields and quality. A person skilled in the art can employ suitable catalyst and operating conditions in order to process feedstocks of varying quality and produce desired product mix.

In one implementation, hydroprocessing of hydrocarbon feedstock is carried out in the cross-flow reactor in such a way that vaporization at reactor inlet is controlled by choosing suitable operating conditions. In another implementation feed vaporization is preferably between 0-80 wt percent of total feed.

The three-phase catalytic hydroprocessing by the reactors and methods of the present subject matter is easier to implement, energy efficient, flexible, handles higher flow rates and allows greater control than conventional reactors and methods. Moreover, three-phase catalytic hydroprocessing in accordance with the present subject matter provides for a significant reduction in feed vaporization, differential pressure along the length of the reactor, non selective cracking to light ends, product inhibition, and dry spots as compared to conventional reactors and methods.

The various aspects and advantages of the present subject matter would be described in greater detail in conjunction with the figures hereafter.

Figure 1B:
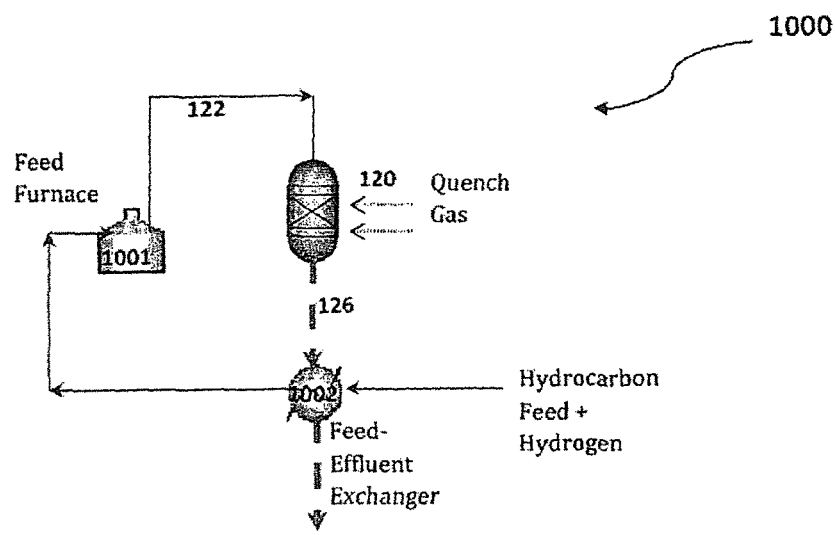
FIG. 1B is a comparative illustration of a conventional co-current down flow reactor and a cross-flow reactor, in accordance with an embodiment of the present subject matter
Figure 1B:
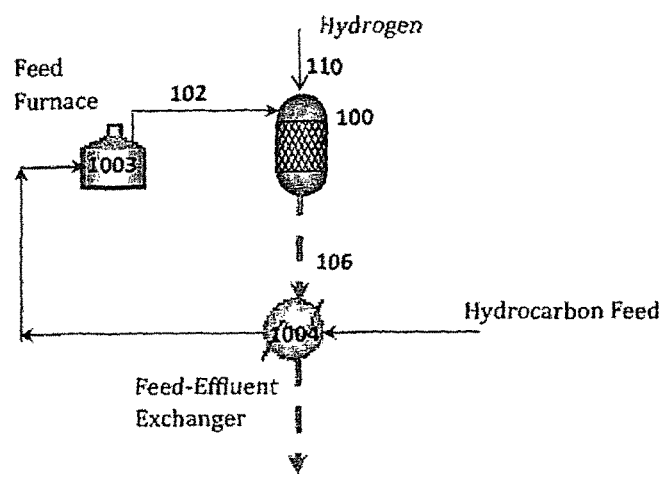

FIG. 1 illustrates comparative block diagram of a cross-flow reactor 100, as described in accordance with different embodiments of the present subject matter, compared with a conventional reactor. The cross flow reactor 100, hereinafter referred to as reactor 100, includes one or more stages 104-1, 104-2 . . . , 104-N (hereinafter collectively referred as stages 104) along the length of middle region in the reactor 100. Each stage 104 of the reactor 100 is independently associated with effluent gas outlet 108-1, 108-2 . . . , 108-N, collectively referred to as effluent outlet 108.

In one implementation, Hydrocarbon feedstock may be introduced from the top of the reactor 100 over the middle region. The hydrocarbon feedstock 102 wets catalyst particles in the middle region along the length of the reactor 100 and across different stages 104 of the reactor 100. The wet catalyst particles come in contact with hydrogen gas, which is in transition along the radial direction of the reactor 100, through the middle region. The hydrocarbon feedstock 102 reacts with the hydrogen gas 110 and hence, gases like hydrogen sulphide and ammonia are generated along with the treated hydrocarbon. The generated gases are removed as effluent from each stage of the reactor through the effluent outlet 108. The removal of the effluent at each stage 104 of the reactor 100 ensures the maintenance of sufficient partial pressure of hydrogen and reduces the product inhibition effect of the reactants at subsequent stages of the reaction. As a result, a better conversion ratio throughout the length of the reactor 100 is obtained. Further, since hydrogen gas 110 may also fed into one or more stages, a substantially uniform $H_2$ partial pressure can be maintained at plurality of stages of the reactor 100. The uniform partial pressure lowers the vaporization of hydrocarbon feedstock 102 due to distributed hydrogen supply through one or more stages of the reactor 100.

Additionally, the partial pressure of gaseous reactant is further maintained in the middle region due to reduction of mean flow path of the gaseous reactant along the length of the reactor 100 as compared to conventional reactors. The removal of gases at every stage of reaction also releases the heat generated due to hydroprocessing reactions, which are exothermic in nature. Additionally, the relatively cooler gaseous reactant introduced in the reactor 100 acts as quenching medium for the reactor 100. The heat generated from the exothermic reaction is balanced by supply of cooler reactant gas through distributor. It thus eliminates the requirement of a separate quenching media 128 and heating of reactant gas along with feed in the furnace as used in the conventional reactors.

At the instance of release of exhaust gases from the reactor, through 108, any entrained liquid, can be separated and re-introduced into the reactor through a recycle stream. Moreover, the gases may then be sent to a separator to recover unreacted hydrogen and lighter hydrocarbon products that may have vaporized. The lighter hydrogen products may be separated into various fractions by a fractionator.

In contrast to the cross-flow reactor 100, conventional reactor 120 receive both hydrocarbon feed and hydrogen gas 122 from the top end of the conventional reactor 120, which then passes through a series of middle regions 124. Various inlets are provided in between the middle regions 124 for introduction of the quenching media 128 to regulate the temperature in the conventional reactor 120. However, typically, there is no provision for the exhaust of gaseous products from the conventional reactor 120, which leads to product inhibition and non selective cracking problems. Moreover, in the conventional reactor 120, the heat generated through hydroprocessing reactions is wasted in quench zones and cannot be re-used, for example, to heat up the relatively cooler reactants as explained above for the cross-flow reactor 100.

FIG. 1B represents comparative illustration of the cross flow reactor 100 with state of the art reactors according to one embodiment of the present subject matter. Conventional hydroprocessing reactor 120 receives hydrocarbon feed stream 122 which includes hydrogen feedstock and reactant gas, after getting heated to reaction initiation temperature in a furnace 1001. Reaction exothermicity is controlled by quench gas additions 128, recovering process heat in feed effluent exchanger 1002. Cross flow hydroprocessing reactor 100 receives hydrocarbon feed stream 102 which may be mixed with optimal hydrogen required for saturating feed, after getting heated in feed furnace 1003 and reaction exothermicity is controlled by cross flow of reactant gas 110 at sufficiently lower temperature across middle region, minimizing heat duty of feed furnace 1003 and feed effluent exchanger 1004. Reactor 100 represents energy efficient design as furnace heat duty is not utilized in vaporization of feed in presence of excess gas phase reactant.

Figure 2:
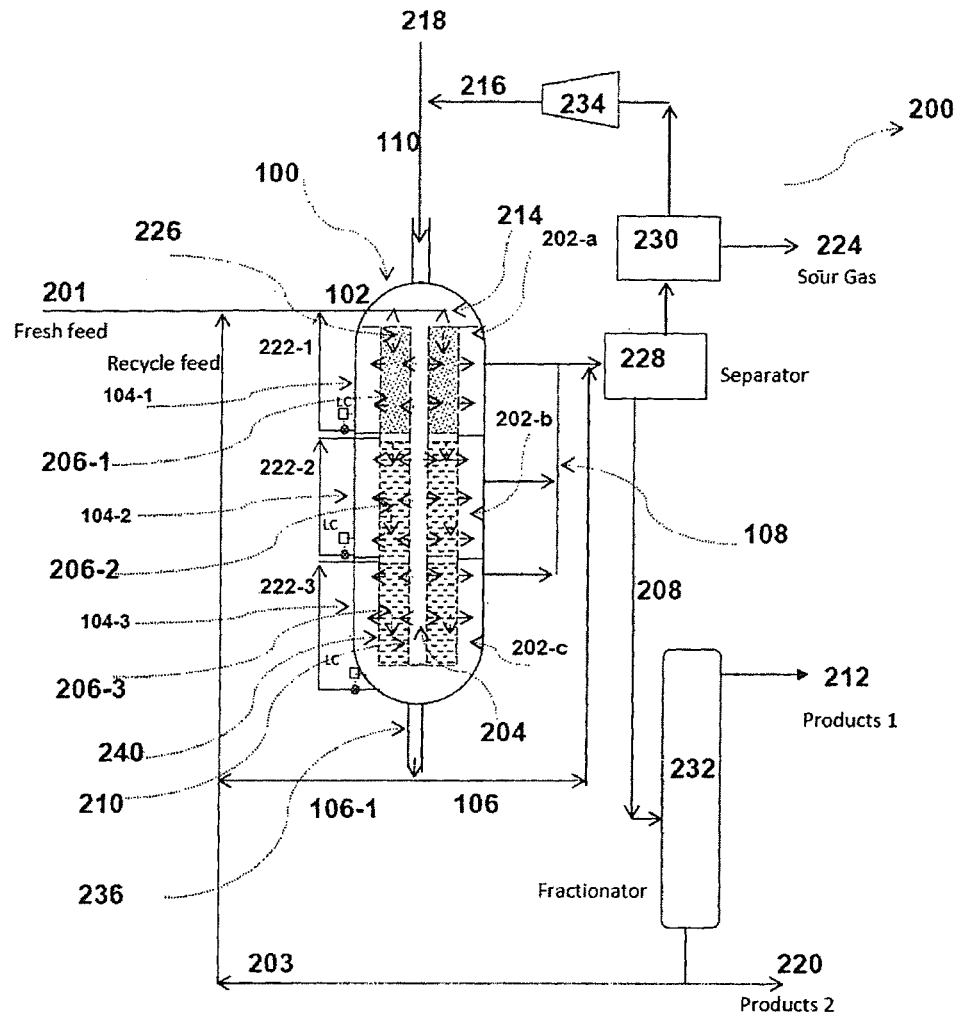
FIG. 2 illustrates a cross-flow reactor, according to one embodiment of the present subject matter.

FIG. 2 illustrates the cross-flow reactor 200. The cross-flow reactor 200 has been interchangeably referred to as reactor 200 herein. In one embodiment, the reactor 200 has an inlet 110 for hydrogen gas, which is connected to a central gas distributor 204. The central gas distributor 204 has perforations 210, on its lateral surface, which facilitates the contact of hydrogen, feed with middle region stages 206-1, 206-2 and 206-3, . . . , 206-N collectively may be referred to as middle region 206. In one implementation, the cross section of perforation may be one of square, triangular, circular, and the like. In one embodiment, the perforation at lateral surface is at an angle lesser than 90° which give gases swirling flow. The swirling flow increases mean flow path and residence time of the gases. In one implementation, the density of perforations 210 on the surface of central gas distributor 204 is based on the exothermicity and extent of reaction at the particular stage. Furthermore, the central gas distributor 204 is closed from the bottom to maintain the sufficient pressure for the flow of hydrogen along the radial direction of reactor 200. The radial flow of gas through perforations leads it to the middle region 206.

The middle region 206 comprises a packed bed of catalyst particles. As understood by person skilled in the art, the middle region 206 may comprise different shape, size, and functionality of catalyst particles 226 for optimizing conversion, product yields, and quality. In one implementation, the middle region 206 may comprise spherical catalyst particles. Alternatively, the middle region may comprise cylindrical catalyst pellets or trilobes or tetralobes and the like. Bed voidage manipulation through catalyst shape and size is envisaged along with perforation size and density variation for effective reactant gas distribution.

The catalyst particles 226 in the middle region 206 are wetted with the hydrocarbon feedstock 102 due to the movement of the hydrocarbon feedstock 102 through the middle region 206, as would be well understood by a person skilled in the art. As already mentioned, the central gas distributor 204 and the middle region 206 are connected through the perforations 210, and this leads to the contact of reactant gas 110, the hydrocarbon feedstock 102 and the catalyst particle 226. This contact under controlled conditions leads to hydroprocessing reactions generating product gases in the middle region 206. The product gases, along with unreacted hydrogen gas, continue to flow in a radial direction towards the outer gas space 202a, 202b, and 202c, collectively referred to as outer gas space 202 through perforated support plates 240 of the middle region 206.

The outer gas space 202 is connected with the effluent outlets 108 of the reactor 200 for every stage 104 of the reactor 200. The hydrotreated liquid flows from one stage to the next stage through porous support plates (not shown in figures) and is finally removed from the bottom of the reactor through outlet 236 which collects the hydrotreated liquid from the middle region 206. In one implementation, the hydrotreated liquid may be recycled with the hydrocarbon feedstock 102 with a suitable recycle ratio as understood by person skilled in the art.

Figure 3A:
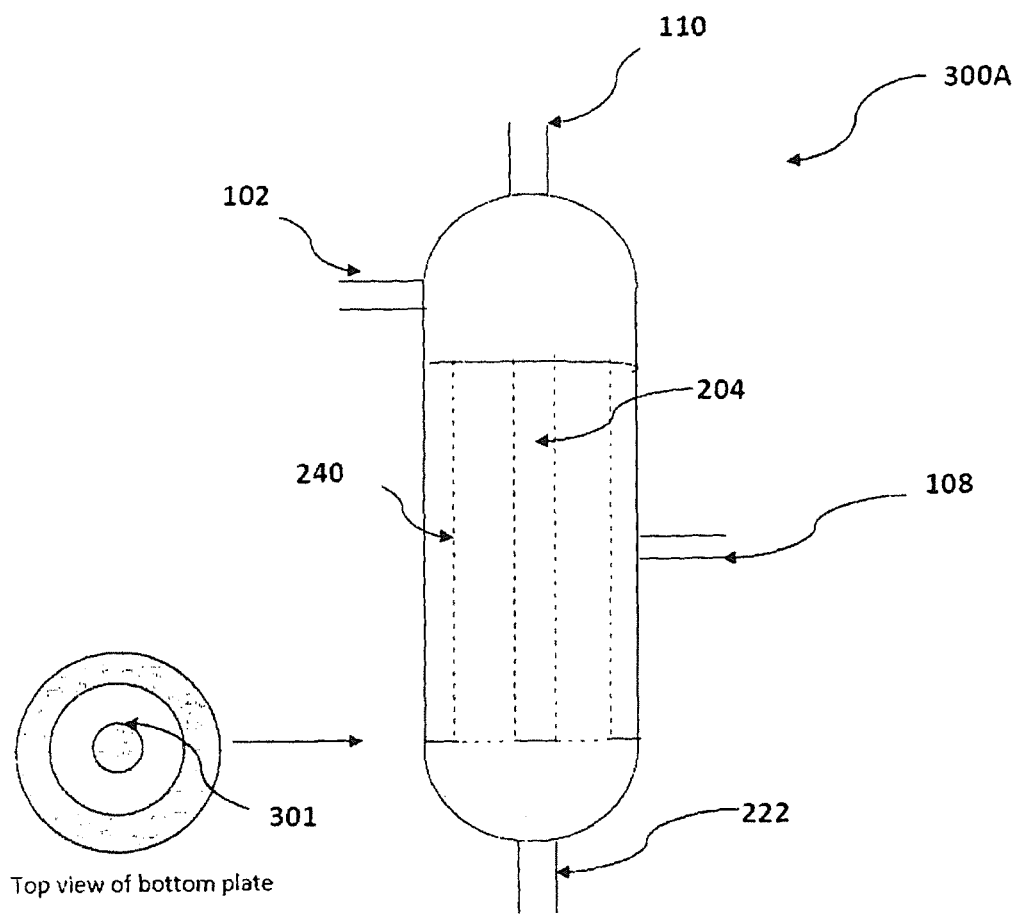
FIG. 3A illustrates a cross flow reactor having a single stage reactor bed, according to one embodiment of the present subject matter.

FIG. 3A illustrates a cross flow reactor 300A with a single bed according to one embodiment of the present subject matter. A catalyst support plate 301 at the bottom end allowing flow of liquid to the outlet 222, and closing the central gas distributor 204 and the outer gas space at the bottom end.

Figure 3B:
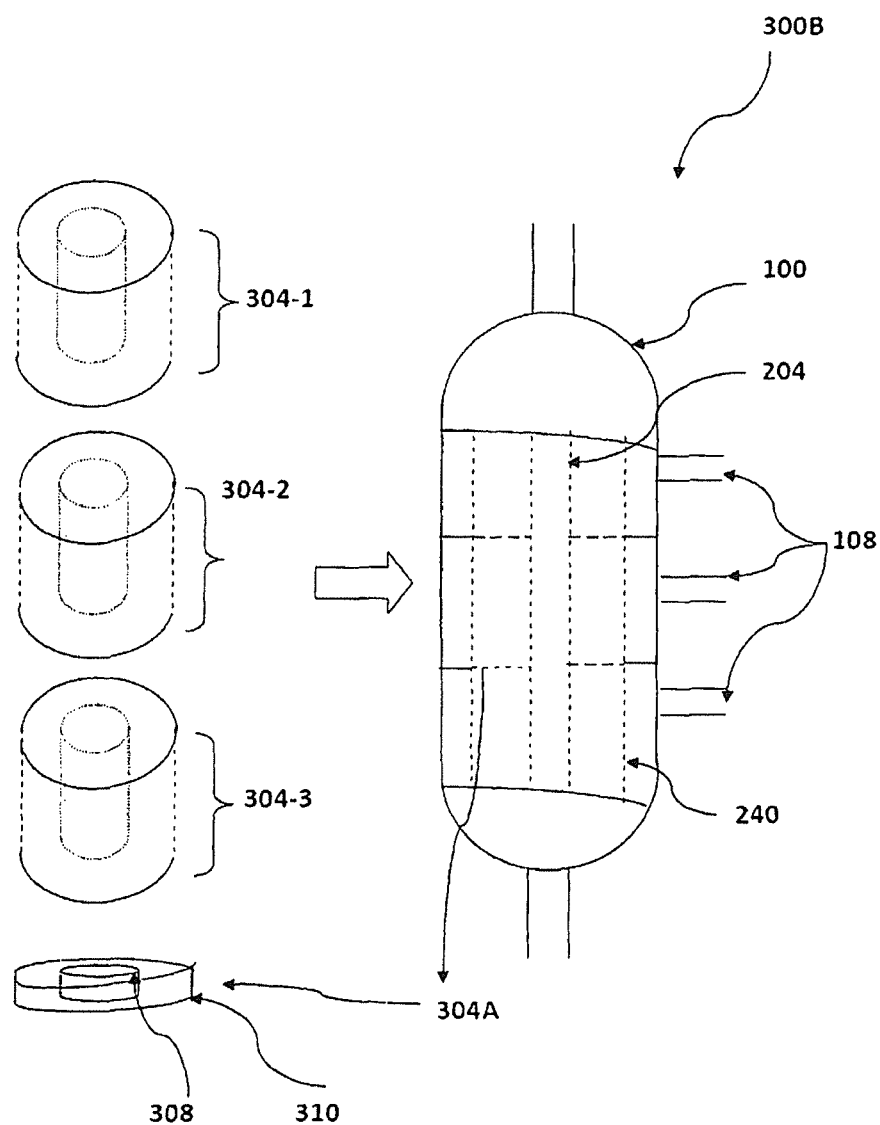
FIG. 3B illustrates a cross flow reactor with multiple stages and outlets, according to one embodiment of the present subject matter.

FIG. 3B illustrates a cross flow reactor 300B with multiple stages and outlets, such that each outlet is associated with an independent stage according to one embodiment of present subject matter. In accordance with this embodiment, the rector 100 is divided in multiple stages 304-1, 304-2, . . . , 304-N, collectively referred as 304, with each stage having associated outlet 108-1, 108-2, . . . , 108-N, collectively may be referred to as 108, as explained before. These associated outlets remove the unreacted gases, product gases and heat energy at each stage of the reactor to minimize the product inhibition and the non selective cracking of hydrocarbon feedstock 102 to light ends during treating. The stages also reduce the mean flow path of the gases and hence pressure drop along the reactor is reduced. This helps in maintaining sufficient hydrogen partial pressure along the length of reactor 300B. Each stage 304 is loaded with catalysts optimized for product yields and quality, catalyst particles are graded in size in each stage, thus providing, variable voidage and enabling desired quantity of reactant gas flow in each stage. In addition reactant gas flow is manipulated as per reaction requirement and exothermicity by varying perforation density and or perforation size on the central gas distributor 204.

Stages 304-1, 304-2 . . . , 304-N are connected in series through N−1 re-distributor structures 304A. The re-distributor structure 304A comprises of a central gas passage zone which connects the central gas distributor 204 of stages in series. The central gas passage is bounded by outer cylindrical non perforated wall 308 to allow passage of gas in entirety to the next stage without any loss in between. The central gas passage is concentric to a middle annular re-distributor to redistribute the liquid hydrocarbon feedstock 102 from the middle region of one reactor stage to the next reactor stage. The middle annular re distributor is internally bounded by the outer non perforated cylindrical wall 308 of the central gas passage as inner wall and a non perforated cylindrical separator plate 310 as outer wall. The non perforated separator plate 310 may comprise of an inlet to receive recycle feed. In one embodiment re-distributor 304A comprises of means to saturate liquid with gas phase reactant in re-distributor zone. In another embodiment, re-distributor 304A separates vapor space 202 of reactor stage above and below itself.

Figure 3C:
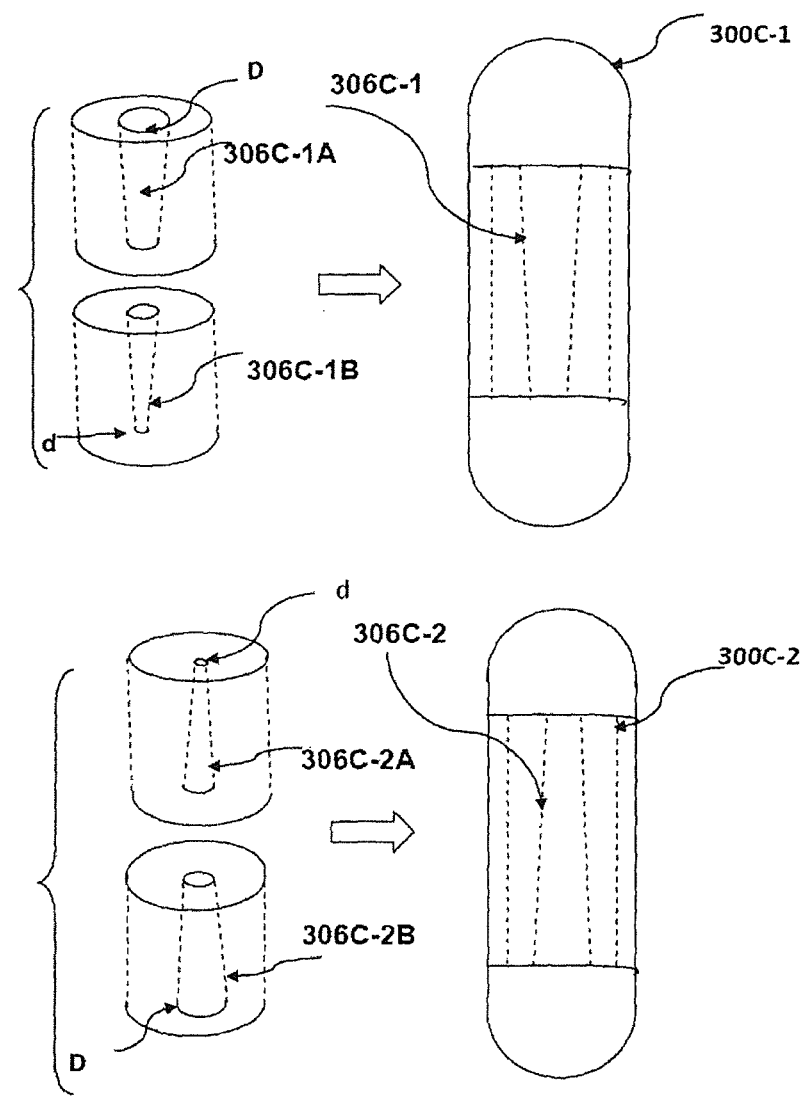
FIG. 3C illustrates a cross flow reactor with tapered central gas distributor, according to one embodiment of the present subject matter.

FIG. 3C illustrates a cross flow reactor 300C-1 and 300C-2, collectively may be referred to as 300C with gradually tapered central gas distributor according to one embodiment of the present subject matter. In accordance with the present embodiment, central gas distributor 306C-1A and 306C-1B, collectively referred as 306C-1, are tapered to maintain sufficient pressure difference along the radial direction of the reactors 300C. The ratio of upper diameter D to lower diameter d can be determined by a person skilled in the art based on a desired differential pressure value in the reactors 300C. In one implementation, the reactor 300C-1 may comprise a tapered cylindrical central gas distributor 306C-1, such that magnitude of D is larger than the magnitude of d. In another implementation, the value of D for the central gas distributor 306C-2 can be lesser in magnitude than the magnitude of d. A person skilled in art would readily able to implement the present implementation based on pressure profile required along the reactor to achieve required degree of uniformity/non uniformity of reactant gas distribution based on extent of reaction and heat release in each stage.

Figure 3D:
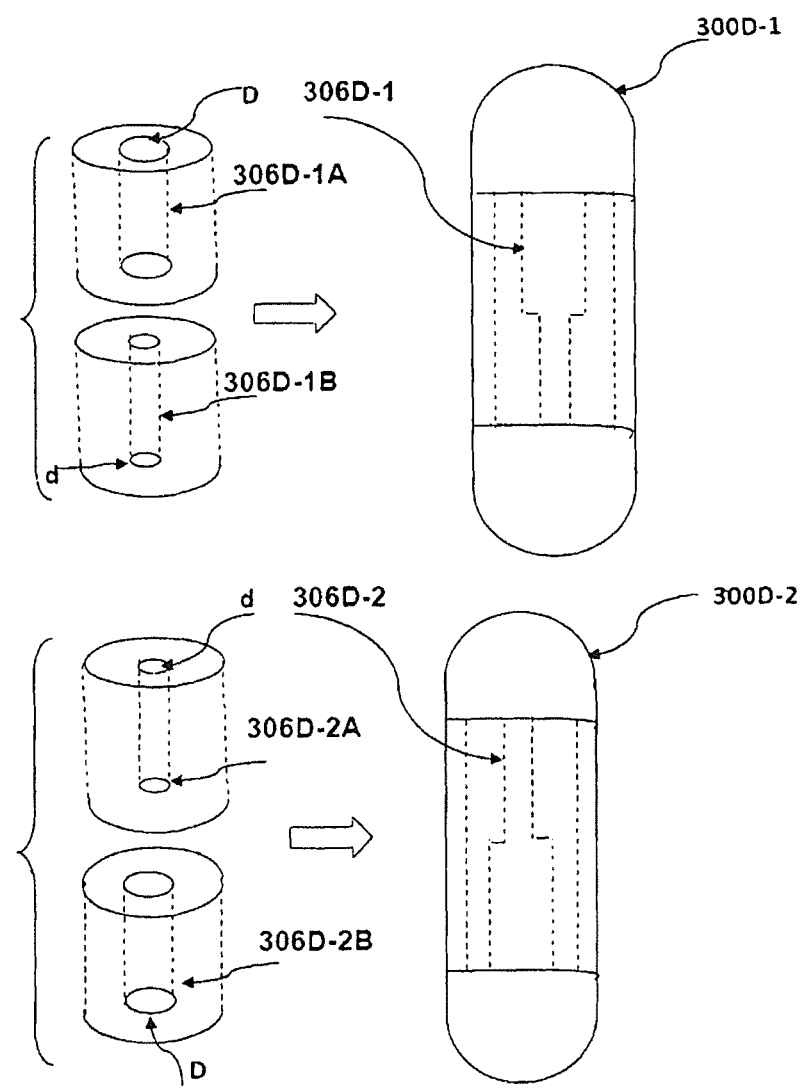
FIG. 3D illustrates a cross flow reactor with stepwise tapered central gas distributor, according to one embodiment of the present subject matter.

FIG. 3D illustrates a cross flow reactors 300D-1 and 300D-2, collectively may be referred to as 300D with stepwise central gas distributor according to one embodiment of the present subject matter. In accordance with the present embodiment, central gas distributor 306D-1A and 306D-1B, collectively referred as 306D-1, are of two different diameters, such that the diameter of 306D-1B is lesser in magnitude than the diameter of 306D-1A. The ratio of upper diameter D to lower diameter d can be determined by a person skilled in the art based on a desired pressure value in the reactor 300D. In one implementation, the reactor 300D-1 may comprise a stepwise cylindrical central gas distributor 306D-1 such that magnitude of D is larger than the magnitude of d. In another implementation, the value of D for the central gas distributor 306D-2 can be lesser in magnitude than the magnitude of d. A person skilled in art would readily able to implement the present implementation based on pressure profile along the reactor 100.

Figure 3E:
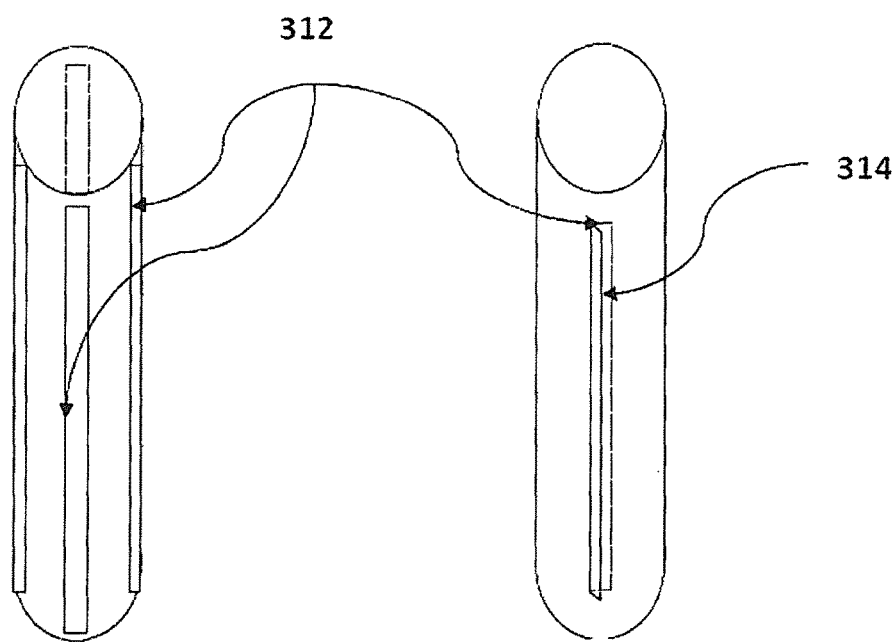
FIG. 3E illustrates a cross flow reactor with slit type central gas distributor, according to one embodiment of the present subject matter.

FIG. 3E illustrates a slit type central gas distributor 300E. The slit type central is gas distributor comprises at least one slit 312 with vertical edge at an angle less than 90°. In one embodiment the angle of slit on the lateral surface may be varied based on the mean flow path to be achieved. In another implementation, the angle of the vertical edge of the slit 312 may be varied based on the residence time of the gases. In one embodiment, the slit may further comprise of at least one guiding vane 314 to induce swirling flow of the gases into the middle region 206. The guiding vanes 314 may be attached separately to the lateral surface. Alternatively, the guiding vanes 314 may be carved out from the lateral surface of the central gas distributor 204.

Figure 3F:
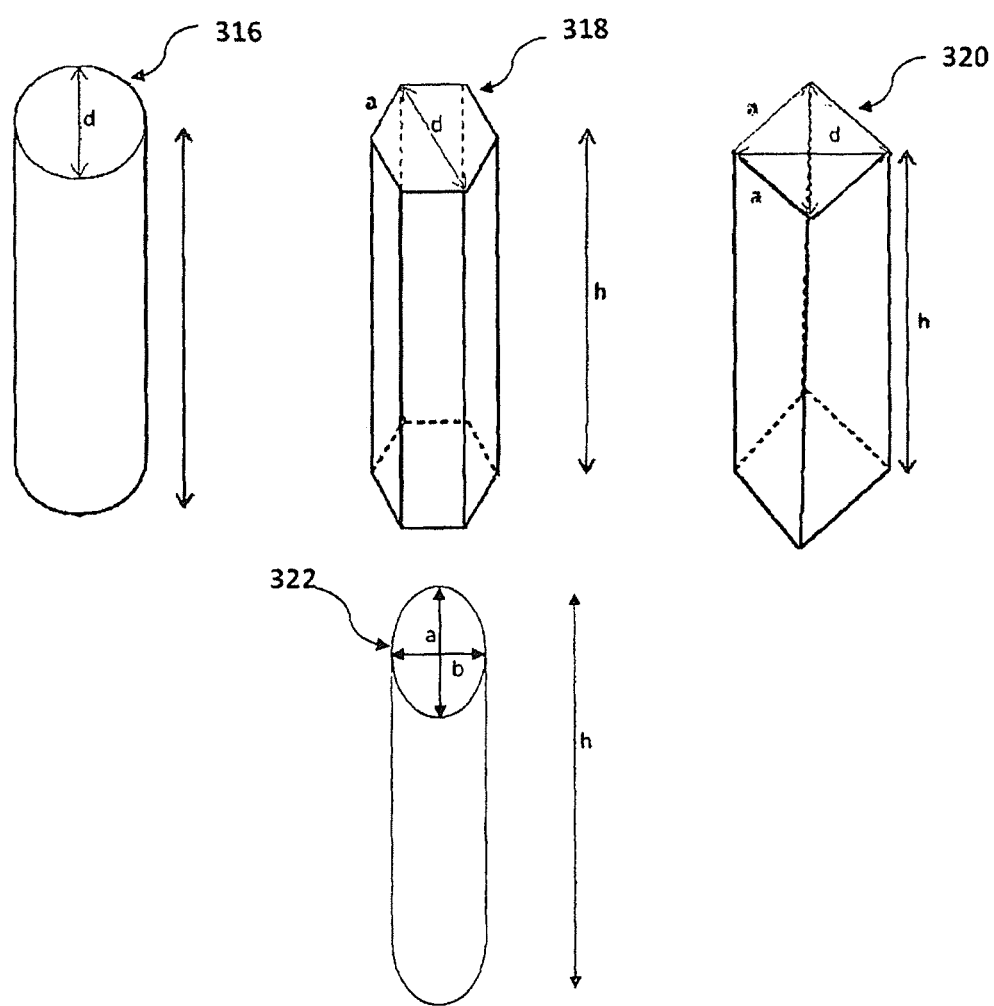
FIG. 3F illustrates a cross flow reactor with different geometries of central gas distributor, according to one embodiment of the present subject matter.

FIG. 3F illustrates various geometries of the central gas distributor according to one embodiment of present subject matter. For example, central gas distributor may have a cylindrical cross section 316. In one implementation central gas distributor has elliptical cross section 322. In another embodiment, the central gas distributor 204 may have hexagonal cross section 318. In one embodiment, the central gas distributor 204, may have a cubical cross section 320. The central gas distributor 204 with cubical cross section 320 provides highest lateral surface per unit volume. The Table 1 tabulates various design parameters achieved in different geometries of central gas distributor 204.

TABLE 1

| Parameter | Central Gas Distributor Shape | | | |
|---|---|---|---|---|
| | Cylindrical | Elliptical<br>a = Major axis = 0.5* d<br>b = Minor axis = 0.3*d | Hexagonal<br>a = 0.5d | Cubical<br>a = 0.707d |
| Distributor volume | $0.785*d^2*h$ | $0.471*d^2*h$ | $0.65*d^2*h$ | $0.5*d^2*h$ |
| Distributor lateral surface area (Theoretical maximum flow area assuming 100% porosity) | $3.14*d*h$ | $2.514*d*h$ | $3*d*h$ | $2.83*d*h$ |
| (Lateral surface area/Volume)$_{distributor}$ | $4/d$ | $5.33/d$ | $4.61/d$ | $5.66/d$ |
| Reactor Volume, diameter 'D' and height 'h' | $(\pi/4)*D^2*h$ | $(\pi/4)*D^2*h$ | $(\pi/4)*D^2*h$ | $(\pi/4)*D^2*h$ |
| $V_{distributor}/V_{reactor}$ | $d^2/D^2$ | $0.6\,(d^2/D^2)$ | $0.83*(d^2/D^2)$ | $0.64*(d^2/D^2)$ |

Figure 4:
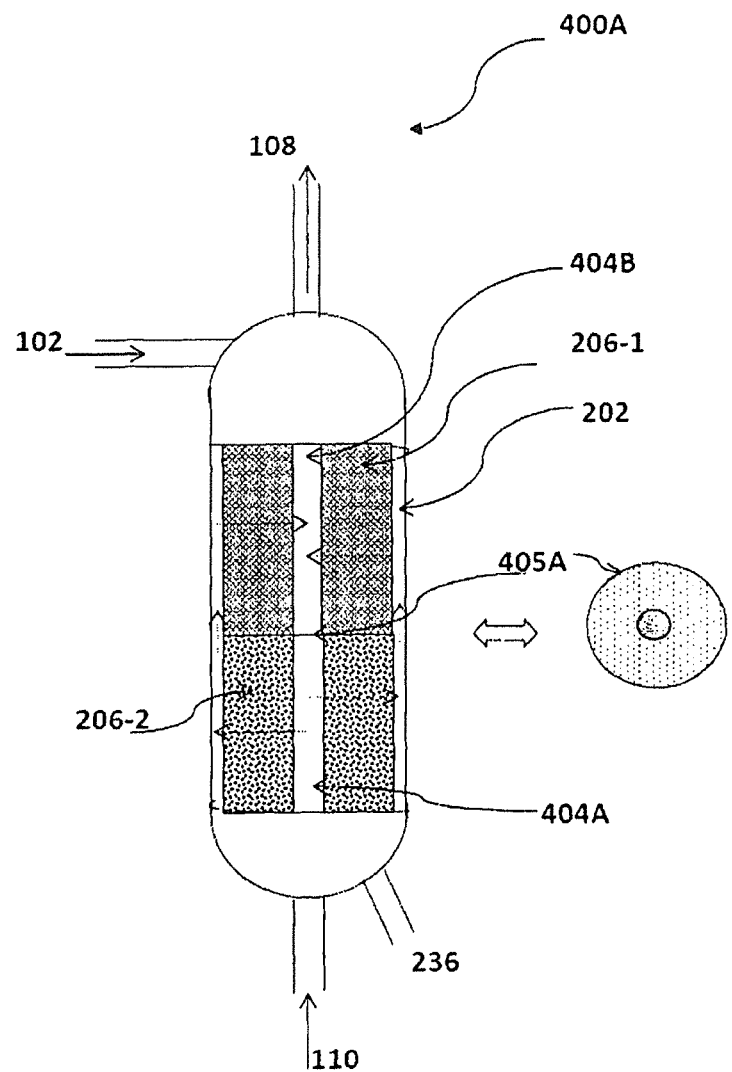
FIG. 4A illustrates a structural variant of a multi-stage cross-flow reactor, according to one embodiment of present subject matter.
FIG. 4B illustrates a cross flow reactor with outer gas space separated into sections according to one embodiment of present subject matter.
FIG. 4C illustrates a cross flow reactor with a multi-branch gas distributor, according to one embodiment of present subject matter.
FIG. 4D illustrates a cross flow reactor with a plurality of gas distributors, according to one embodiment of the present subject matter.
Figure 4:
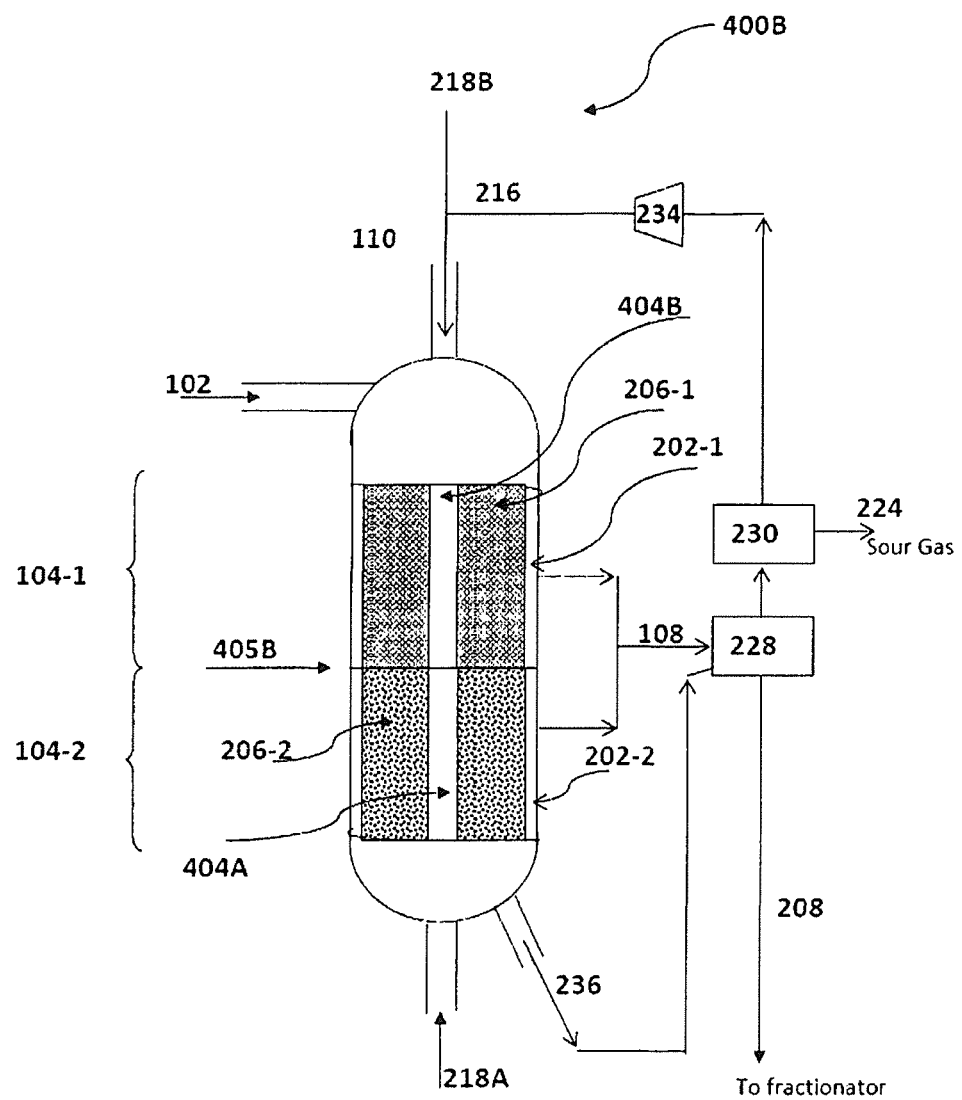
Figure 4:
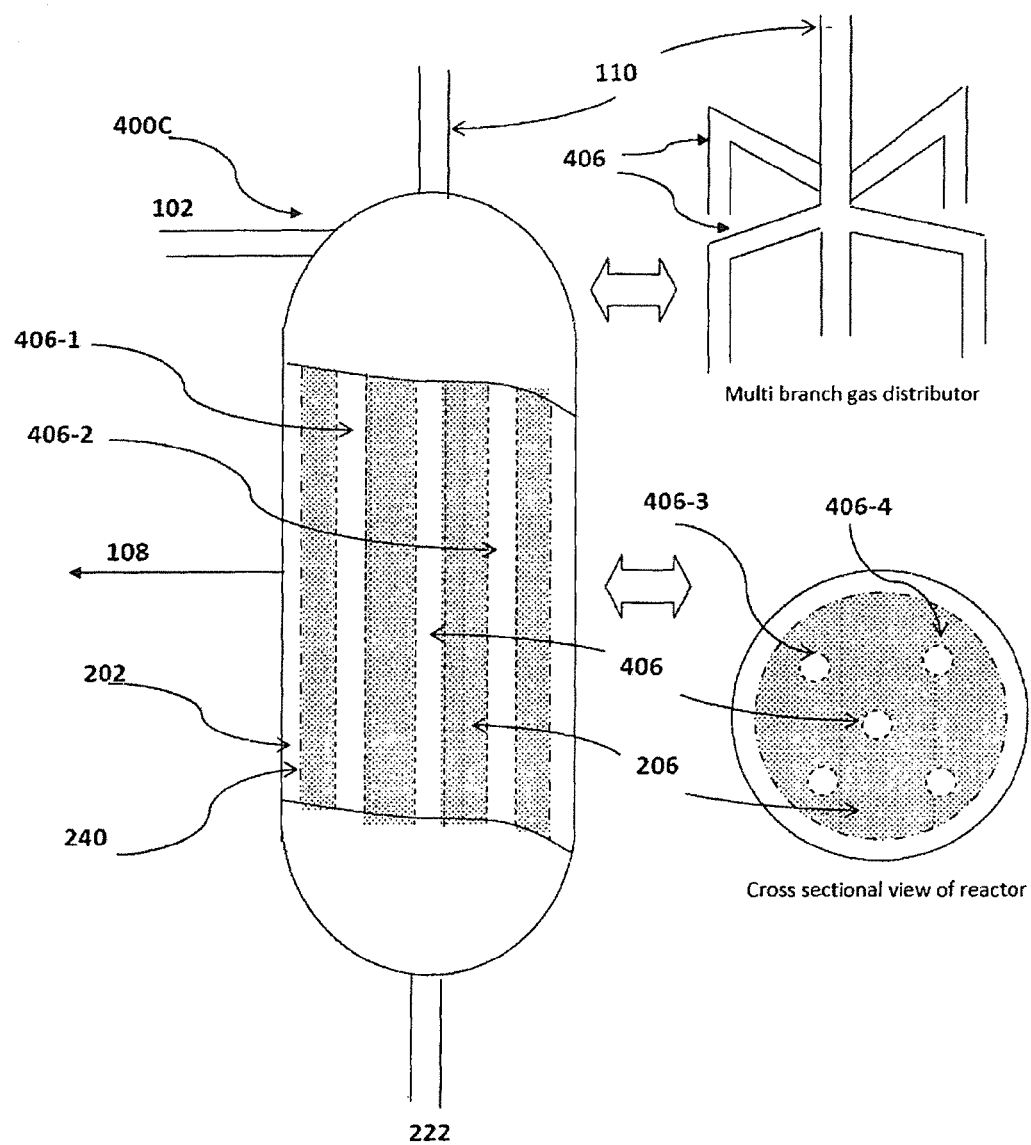
Figure 4:
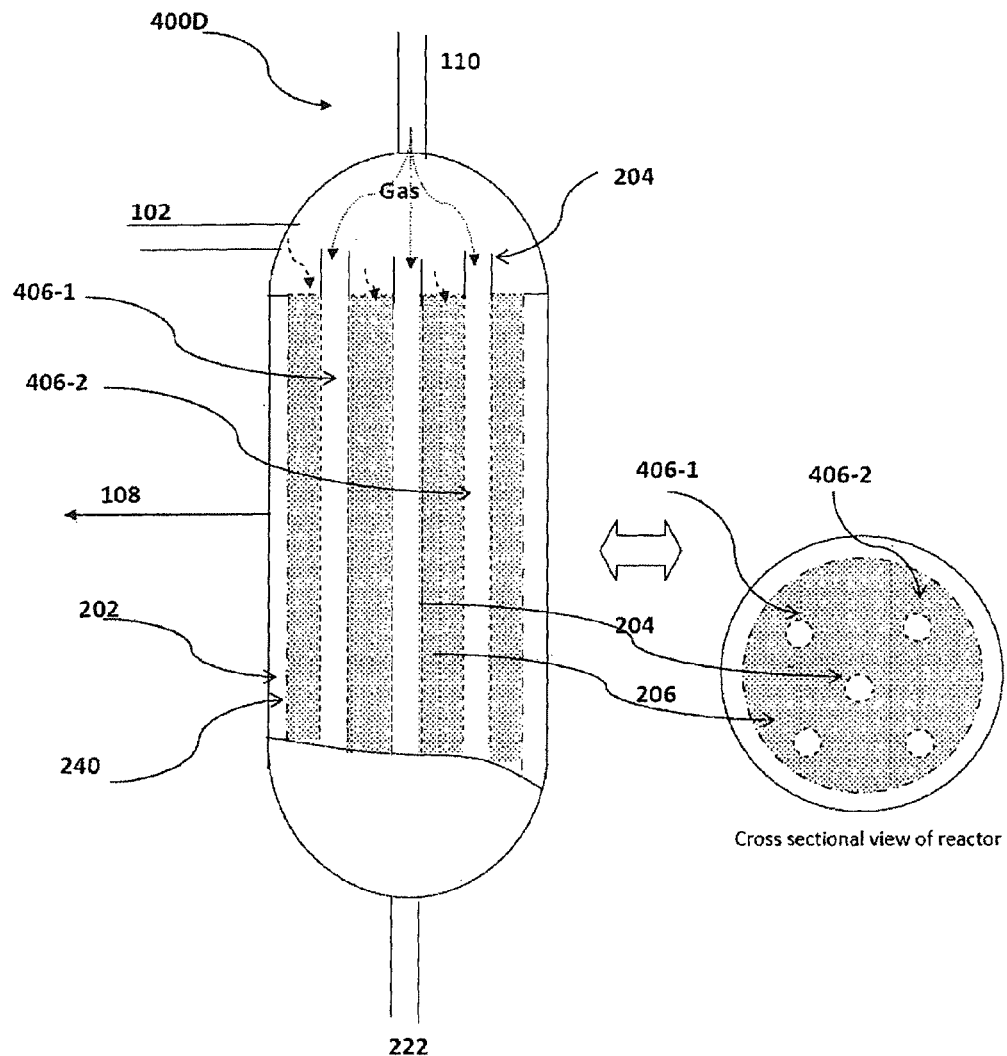

FIG. 4A illustrates a cross flow reactor 400A with separated central gas distributor 404 by an internal 405A, allowing flow of liquid from secondary middle region (206-1) of secondary stage to primary middle region (206-2) of a primary stage while separating central gas distributor 404 as primary central gas distributor 404A and conduit 404B and without dividing outer gas space 202. Fresh reactant gas 110 is fed through 404A, in contact with treated feed which is leaner in hetero atoms trickling down from the secondary middle region (206-1) of secondary stage. In the primary middle region (206-2) of primary stage, the hydrocarbon feedstock 102 is further treated to meet desired quality and yields before being discharged via outlet 236. Vapor phase products and unreacted gas then flows through outer gas space 202, flows radially through secondary middle region 206-1 of secondary stage from outer periphery thus contacting and reacting with the hydrocarbon feedstock 102 before entering into the conduit 404B in secondary stage. From the conduit 404B vapor phase products and unreacted reactant gases are discharged via outlet 108 to the battery of gas-liquid separator and reactant gas recovery and recycle.

FIG. 4B illustrates a cross flow reactor 400B with separated central gas distributor 404 by means of internal 405B which separates outer gas space 202 into sections 202-1 and 202-2, each connected to the secondary middle region 206-1 and primary middle region 206-2. Make up gas 218A is distributed through primary central gas distributor 404A, reacting with liquid trickling from the secondary middle region 206-1, vapor phase products and unreacted reactant gas is collected in the outer gas space 202-2 and routed to gas liquid separator 228 via combined outlet 108. Reactant gas is recovered and recycled back as 216 to reactor gas inlet 110 for secondary central gas distributor 404B. Additional reactant gas requirement for secondary middle region 206-1 is fulfilled through make up gas addition 218B.

FIG. 4C illustrates a cross flow reactor 400C with a axisymetric central gas distributor 204, with multiple branches 406-1, 406-2, 406-3 . . . , 406-N, collectively may be referred to 406 in addition to central gas distributor 204. Each of branches acts as an independent gas distributor for the reactant gas and connected through common inlet 110. In one implementation the physical structure of branches of central gas distributor is same as other branches For example, branches 406 have identical perforation distribution and upper and lower diameter as the central gas distributor 404. In another implementation, the physical structure may be varied based upon reaction conditions. In one implementation, liquid reactant enters through 102 and trickles down through catalyst bed 206. The reactant gas enters through 110 and is distributed uniformly across catalyst bed 206 by means branches 406. The distributed reactant gas reacts with hydrocarbon liquid and vapor phase products along with unreacted gas and is collected in outer gas space 202 through porous outer support plate 240. Treated liquid reactant is discharged through a recycle stream 222. In one implementation the treated liquid is recycled through 222 to a separator for separating the unreacted hydrocarbon. The separated unreacted hydrocarbon can be recycled to the fresh feed in the reactor through 216. Multibranched axisymetric gas distributor results in uniform gas distribution and assists in temperature control of exothermic hydroprocessing reactions.

FIG. 4D illustrates a cross flow reactor 400D with a plurality of gas distributors 406-1, 406-2, . . . , 406-N, collectively may be referred to as 406, in addition to central gas distributor 204. In one implementation, the liquid reactant enters through 102 and trickles down through catalyst bed 206. The gas reactant enters through 110 and is distributed uniformly across catalyst bed 206 by means of gas distributors 406. The gas reactant reacts with hydrocarbon liquid to form and vapor phase products in the catalyst bed 206. The product gases along with unreacted gas are collected in vapor space 202 through porous outer support plate 240. Treated liquid reactant is discharged through the recycle stream 222. In one implementation an axisymetric gas distributors may be implemented for uniform gas distribution. The plurality of gas distributors assists in better temperature control of exothermic hydroprocessing reactions. A person skilled in the art can devise various ways and use state of the means to distribute liquid and introduce gas into the gas distributor in accordance to present subject matter while not limiting to embodiment described in particular.

In one implementation with plurality of gas distributors are of identical shape and perforation pattern; where in shape can be selected from any of the cylindrical, tapered cylindrical, elliptical, cubical or hexagonal type. In another implementation, at least one of the gas distributors has different perforation pattern and shape selected from any of the cylindrical, tapered cylindrical, elliptical, cubical or hexagonal type.

Figure 5:
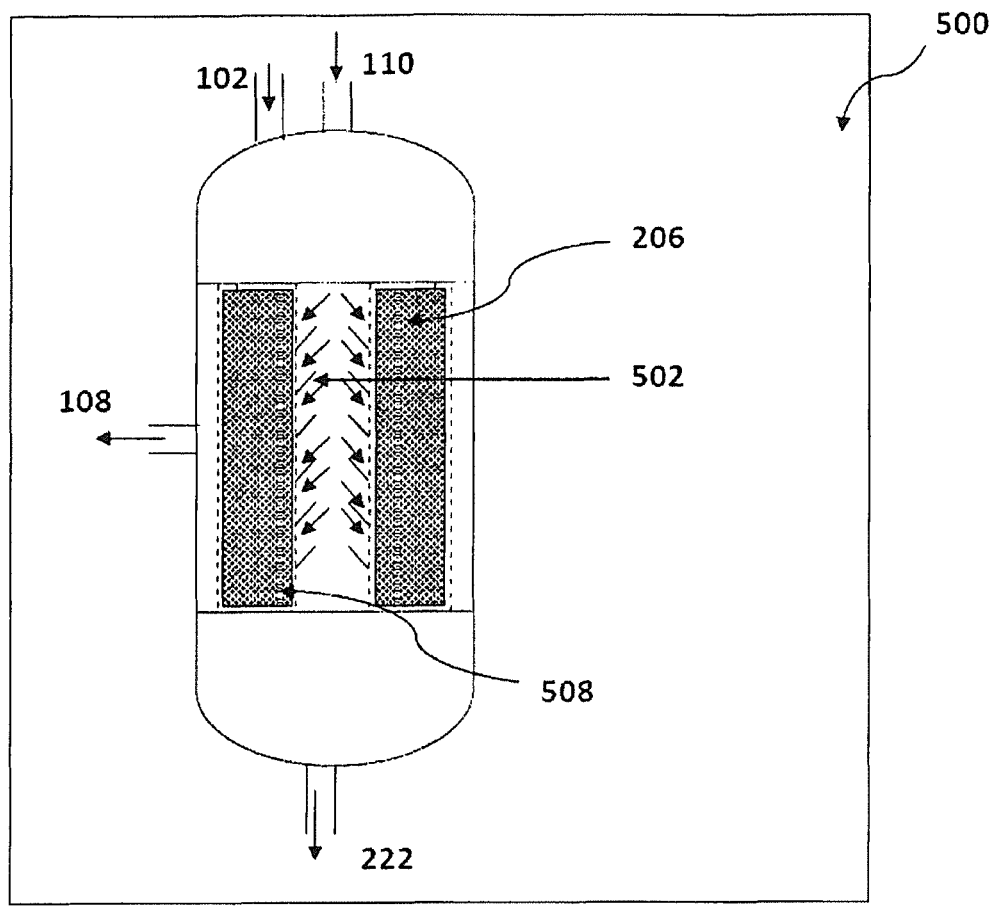
FIG. 5 illustrates a structural variant of a cross-flow reactor with oblique baffles on the central gas distributor, according to one embodiment of the present subject matter.

FIG. 5 illustrate a structural variant of a cross-flow reactor 500 with oblique baffles 502 on the central gas distributor 204, according to one embodiment of the present subject matter. These baffles reduce effect of impinging gas by changing the angle of contact of gas with the surface of catalyst particles 226 in the middle region 508. In one implementation, the baffles 502 help in reduction of dry spots on the catalyst by changing the contact angle with wetted catalyst, which is otherwise tangential to liquid flow displacing the hydrocarbon feed from the surface, thus causing dry spots. As the direction of flow of gas is varied by an angle, the pressure force on the catalytic surface is reduced in the radial direction and hence the radial displacement of hydrocarbon feed is substantially reduced. A person skilled in the art can devise several other designs such as a distributor block element with reduced jet impingement, more gradual swirl action and the like.

Figure 6:
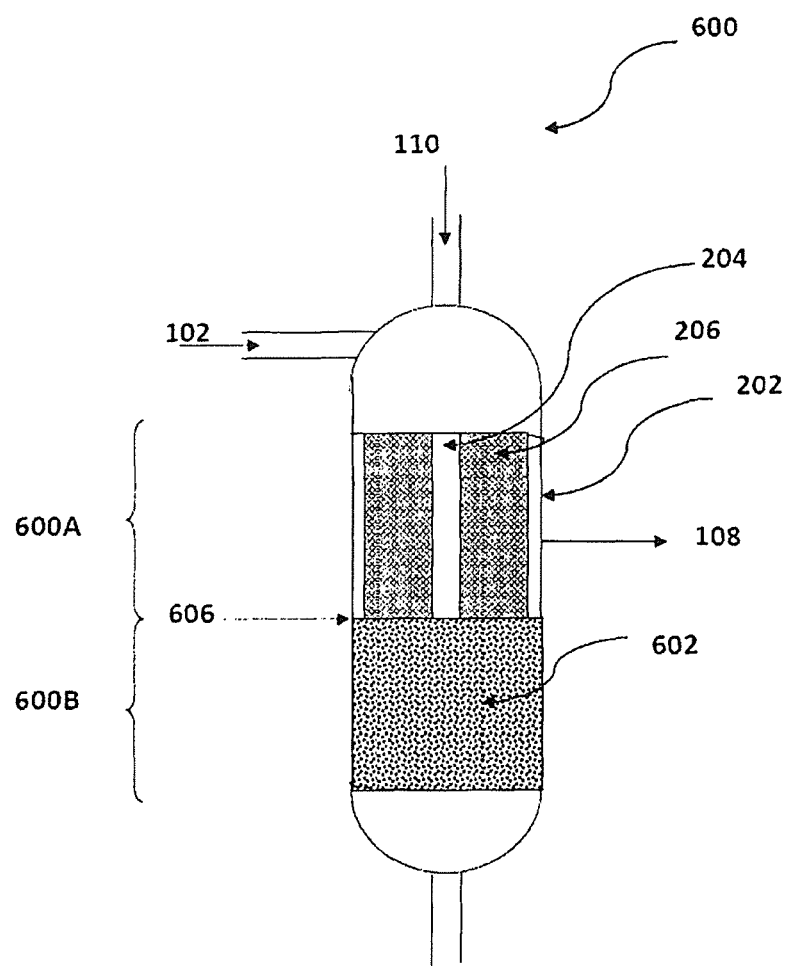
FIG. 6 illustrates a cross-flow reactor configuration with hybrid structure including co-current and cross-flow reactor stages, according to one embodiment of the present subject matter.

FIG. 6 illustrate a cross-flow reactor 600 configuration with hybrid structure including co-current and cross-flow reactor stages, according to one embodiment of the present subject matter. The reactor 600 is horizontally divided into two stages an upper stage 600A and a lower stage 600B. The upper stage 600A of the reactor has a cross-flow reactor arrangement, similar to that of embodiment described in FIG. 3A of the description. The upper stage 600A is described using the same reference numeral as that of FIG. 3A. The lower stage 600B comprises a conventional packed middle region 602. The reactant hydrogen gas is introduced in the central gas distributor 204 of the reactor through an inlet 110. The hydroprocessing process proceeds the same way as described with reference to FIG. 3A of the description. The hydrotreated liquid obtained from the upper stage 600A of the reactor 600 is fed to the lower stage 600B having conventional packed middle region by means well understood in state of art. The feed is further hydroprocessed through the conventional packed middle region 602 by technique well understood in state of art. In one implementation, zones 600A and 600B are of similar height. A person skilled in the art can devise relative size of treating zones based on process requirements.

The total sulphur content of hydrocarbon feedstock 102 may constitute of refractory and non-refractory sulphur component. Typically, the non-refractory sulphur forms the 80-90% of the sulphur component in the petroleum. In one implementation, non-refractory sulphur component of the total sulphur content in the petroleum may be targeted to be removed from the upper stage 600A of the reactor 600 using a Cobalt-Molybdenum (Co—Mo) catalyst. Additionally the refractory sulphur in feedstock may be removed in the lower stage 600B of the reactor 600 using Nickel Molybdenum (Ni—Mo) catalyst. In another implementation, the lower stage of the reactor 500 may be provided with a separate hydrogen supply 606 in co current or counter-current fashion to remove refractory sulphur from the hydrogen feedstock 102.

Figure 7:
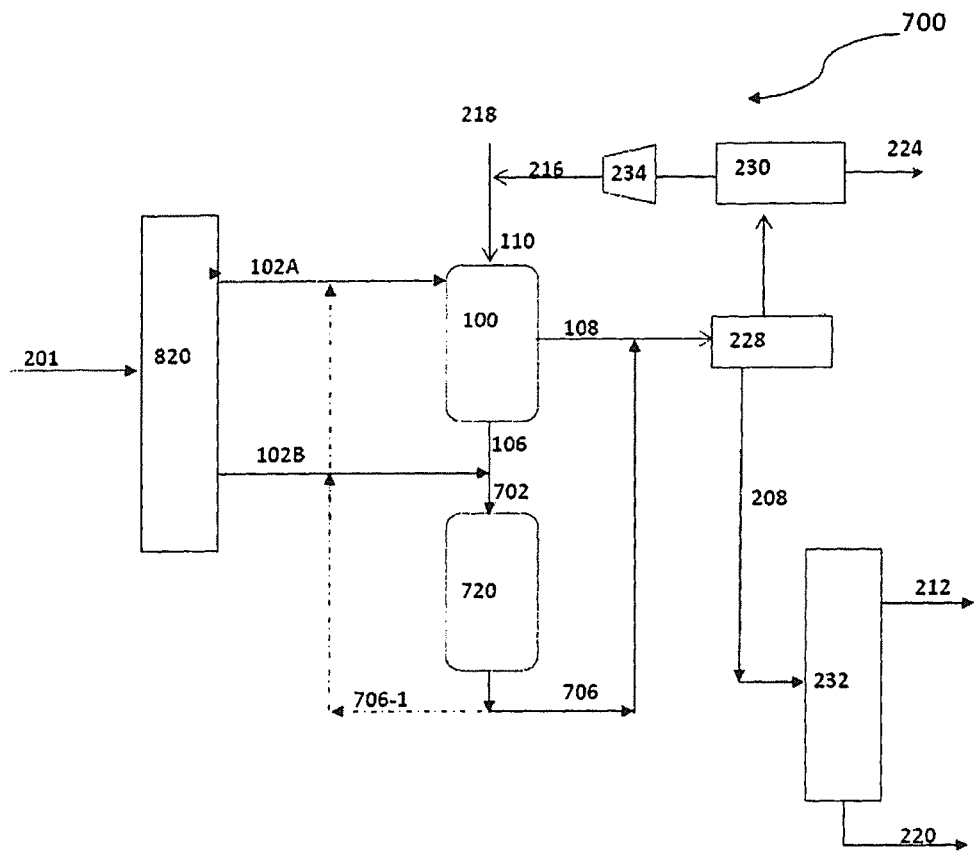
FIG. 7 illustrates the arrangement of present subject matter in conjunction with other state of art reactors, according to one embodiment of present subject matter.
Figure 8:
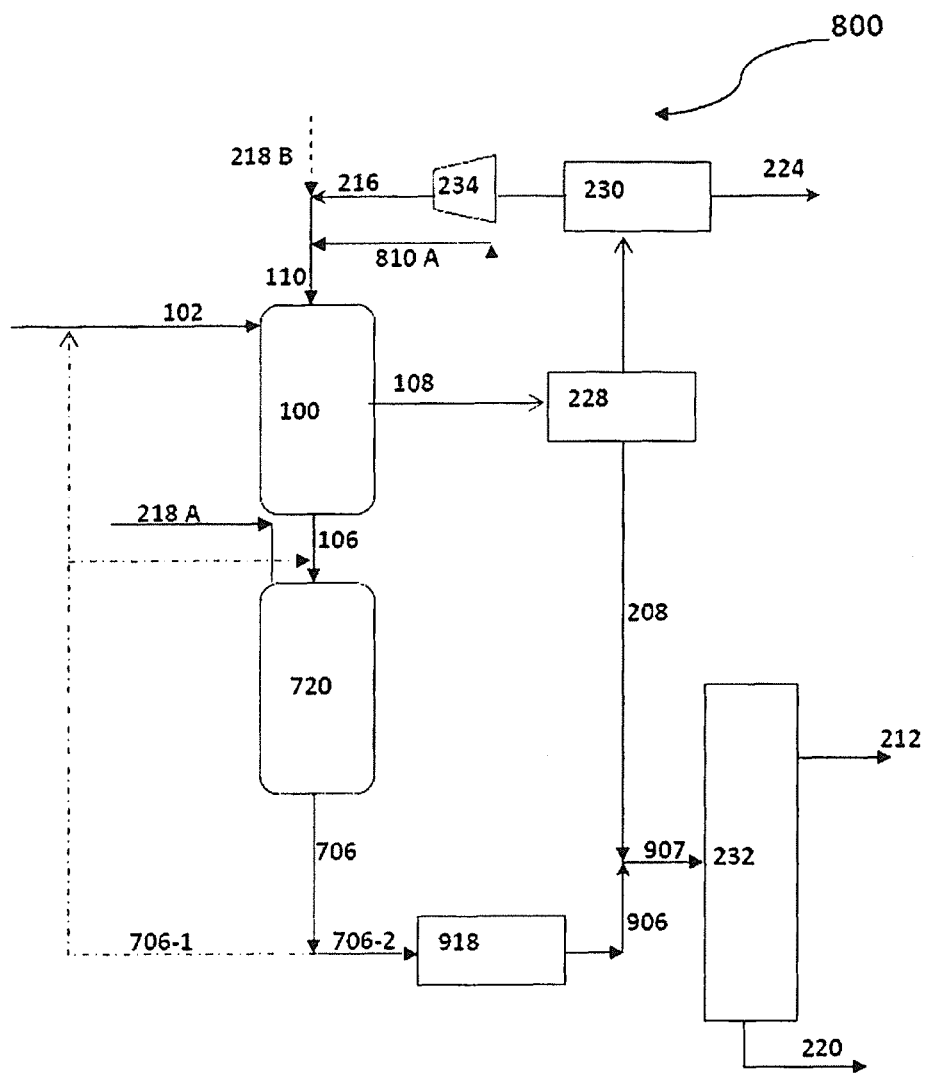
FIG. 8 illustrate arrangement of present subject matter with state of art reactors, according to one embodiment of present subject matter.

FIG. 7 illustrates another embodiment of the present subject matter illustrating an arrangement 700 of the reactor 100 with state of art reactors. In accordance with this embodiment, the hydrocarbon feed 201 is split by a feed splitter 820 into two streams 102A and 102B. The person skilled in the art can deduce optimum split ratio based on feed and product quality. The stream 102A is fed to the reactor 100. The stream 102B is fed to a conventional fixed bed reactor 720 connected to the reactor 100. The reactor 100 and conventional fixed bed reactor 720 operate in same way as illustrated in embodiment illustrated in FIG. 7 of the description. The stream 102B is treated in the conventional fixed bed reactor 720 along with the effluent 106 of reactor 100 as illustrated in FIG. 8. In one implementation, the conventional fixed bed reactor 720 is provided with the additional hydrogen to overcome the additional requirement of hydrogen for the stream 102B by recycling the stream 706-1 at a suitable ratio as may be determined by the person skilled in the art.

FIG. 8 illustrates another embodiment of the present subject matter illustrating an arrangement 800 of the reactor 100 with state of art reactors. In accordance with this embodiment, the hydrocarbon feedstock 102 is first hydroprocessed in the reactor 100. The effluent 106 from the reactor 100 is routed to the conventional fixed bed reactor 720 with makeup hydrogen supply 218A, effluent stream 706 is separated into vapor and liquid fraction, vapor fraction 810A rich in hydrogen and lean in sour gas is fed to reactor 100. Vapor effluent 108 from the reactor 100 is routed through 228 and 230 to separate light ends and sour gas, hydrogen rich gas 216 is recycled to reactor 100 through recycle compressor 234. The hydrogen stripped effluent liquid 208 and 906 is sent to a fractionator 232 for recovery of light ends 212 and final hydrotreated liquid 220. Additional make up gas 218B is fed to reactor 100 depending upon reaction requirements. A person skilled in the art can determine battery of gas-liquid separators and efficient means to recycle hydrogen rich gas to the reactor. In one implementation, reactor 720 and 100 is provided with the additional hydrogen to overcome the additional requirement of hydrogen for stream 702 by recycle stream 706-1 at a suitable ratio as may be determined by the person skilled in the art.

Figure 9A:
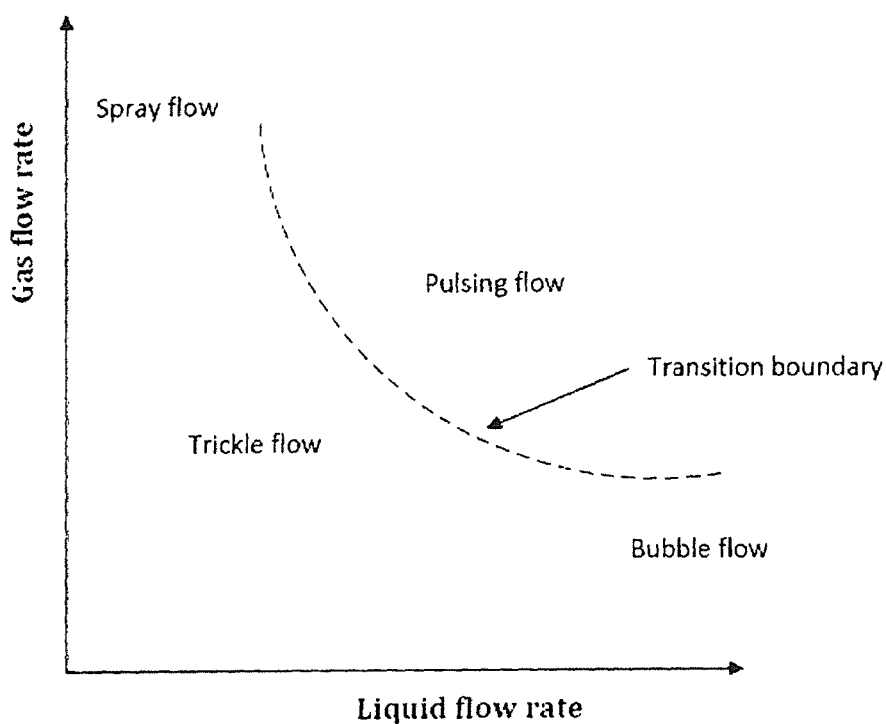
FIGS. 9A and 9B illustrates pulsating flow regime and types of pulsating flow of liquid feedstock and gases possible respectively, according to one embodiment of present subject matter.
Figure 9B:
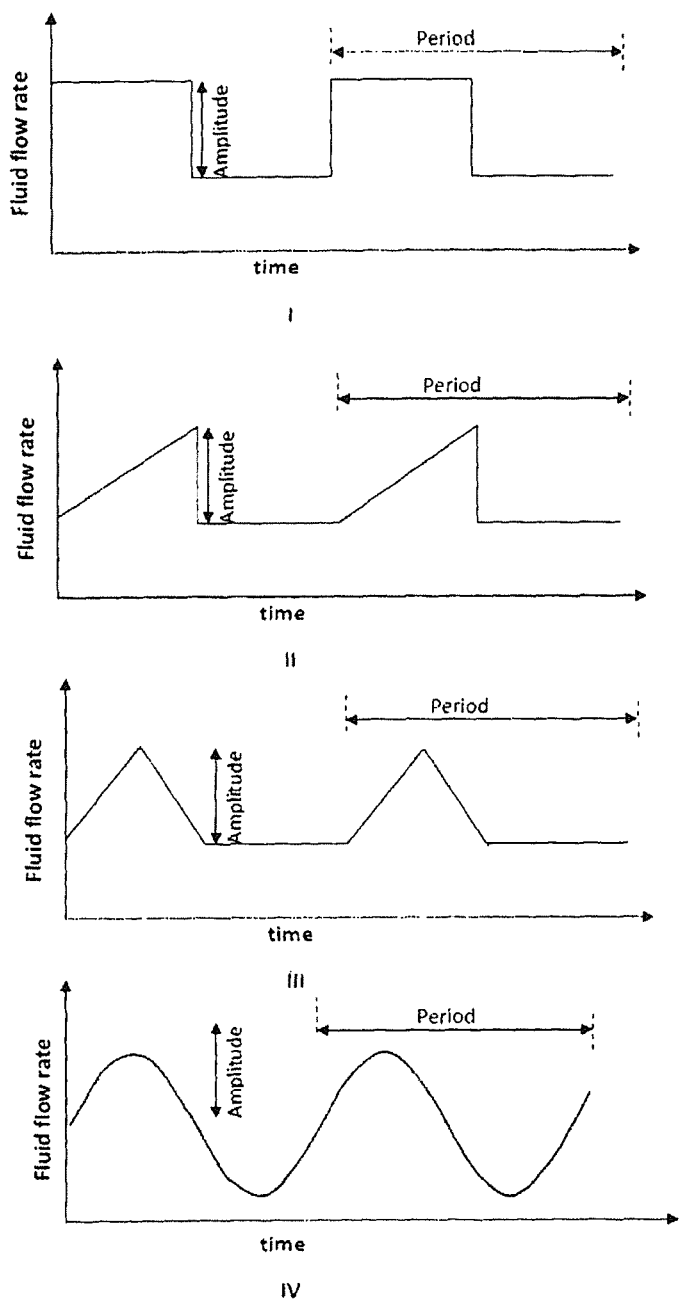

FIG. 9A and FIG. 9B illustrate one implementation of the present subject matter wherein a natural pulsating cross flow regime may be used for operation of cross flow reactors. FIG. 9A illustrates the various regime of flow of liquid and gas in a reactor. As understood by person skilled in the art, various flow regimes typically depend upon flow rate of gases and liquids in the reactor. As illustrated in FIG. 9A, a low liquid flow rate and a high gas flow rate results in a spray flow. The spray flow transits to pulsing flow as liquid flow rate is increased above a critical point for a given gas flow rate. Similarly, trickle flow which results due to medium gas and liquid flow rate approaches to the pulsing flow as the flow rate of liquid or gas increases for given gas or liquid flow respectively. The bubble flow regime occurs at high liquid flow rate and low gas flow rate. The transition from bubble flow regime to pulsing flow rate may happen by increasing the gas flow rate for a given liquid flow rate. Thus, the critical point beyond which the transition of flow regime occurs forms a transition boundary in the gas-liquid flow regime curve. A person skilled in the art will be able to recognize the transition boundary characteristic of the reactor for transition from any of the flow regime to pulsing flow regime.

FIG. 9B illustrates types of induced pulsating flow that can be used in a cross flow reactor. Pulsating flow can be induced at fluid velocities lower than that causing natural pulsing flow through various techniques as may be understood by person skilled in art. For example, the pulsating flow can be achieved by varying liquid flow or gas flow for a short duration of time to create an impulse. As illustrated in FIG. 9B I, II, and III, the impulse may be generated by varying the flow rate with the time in cyclic manner. Thus, for example, an impulse may be generated by maintaining a constant flow and then suddenly dropping the flow for a fixed duration, and then providing again a constant flow in cyclic manner. In another implementation, the flow is increasing with time for a fixed duration and then drops to lower value for a fixed duration and so on. The pulsating flow rate results in improved particle-liquid mass and heat transfer rates, large gas-liquid interfacial areas and complete catalyst wetting.

In one implementation, the pulsing flow may be introduced by oscillating flow rates of either gas or liquid around a mean flow rates lesser than that required for natural pulsing regime as illustrated in FIG. 9B IV. In such a case, the pulsating flow creates turbulence and catalyst bed is thoroughly irrigated with oscillating flow pattern resulting in complete utilization of catalyst bed and minimizes temperature gradients and increases interaction between reacting phases In one implementation, the liquid can be in pulsating mode while the gas flow is constant. For example, liquid induced pulsing can be achieved by modulating flow of recycle liquid. Several variations can be devised in liquid flow through appropriate design of distributor or using multiple distributors. In one embodiment the liquid flow can be inclined in axial direction while radially covering the bed cross section. It is understood that such a scheme can enhance the bed wetting and improve the gas/liquid mass transfer and uniform temperatures.

In another implementation, gas induced pulsing may be used in the cross flow reactor. This would create pulses in radial direction throughout the catalyst bed, creating oscillating flow pattern of the liquid around catalyst particle, and thus reducing liquid film resistance to mass transfer of gas to the catalyst surface and ultimately enhancing mass transfer in gas limiting reactions. A person skilled in the art can easily deduce propagation of fluid pulse in reactor; amplitude, period, frequency of pulse and means required to operate cross flow reactor in induced pulsing regime. In yet another variation, both gas and liquid flows can be pulsating.

The method and apparatus for three-phase contacting and reactions in a cross flow reactor according to various embodiments of the subject matter have been described with reference to the figures in the description. Various experimental results are described herein to validate the various embodiments.

The results are described below are only for the purpose of explanation of the benefits of the subject matter described herein, in some specific conditions and, are not to be construed as limiting the scope of the present subject matter.

The benefits of the cross-flow reactor in accordance with the present subject matter are tested over the conventional packed bed reactors in given operating conditions. Table 2 below compares the feed vaporization at inlet, vapor and liquid fraction at the entrance for conventional reactors with cross flow configuration with respect to subject matter described in accordance to FIG. 1.

TABLE 2

EXPERIMENTAL RESULTS
Operating conditions

| Temperature | 324° C. |
| Pressure | 45 bar |
| Feed Properties | |
| Density | 0.8716 gm/cc |
| Sulfur | 1.92 wt % |

| ASTM D86 | |
| % | ° C. |
| 0 | 118 |
| 10 | 226 |
| 30 | 279 |
| 50 | 304 |
| 70 | 330 |
| 90 | 366 |

| | Convention trickle bed | Reactor 100 |
|---|---|---|
| Gas/Oil ratio (Nm3/m3) | 400 | 133* |
| Feed rate (t/d) | 4200 | 4200 |
| Inlet vaporization (Wt %) | 25 | 10.28 |

TABLE 2-continued

EXPERIMENTAL RESULTS
Operating conditions

| Vapor fraction | 0.87 | 0.63 |
| Liquid fraction | 0.13 | 0.37 |

With reference to table 2, it can be observed that the having a common feed rate, the gas to oil ratio, feed vaporization and vapor fraction has decreased considerably as compared to the conventional trickle bed. It may further be observed that the liquid hold up for the reactor as described in herein is higher than the conventional reactors. Thus reactor 100 can be used for low pressure (to the extent allowing aromatic saturation) hydroprocessing [15-2500 psi] as it will have lower feed vaporization compared to conventional reactor. Further by including optional recycle of hydrogen saturated product stream, reactor pressure can be significantly reduced.

In another experimental test, it is demonstrated that the present subject matter leads to enhancement of rate of desulphurization, denitrogenation due to reduced inhibition effect. Typically a hydrocarbon oil hydrotreating rate is expressed through following rate expression $$Rs = \frac{kC_s^m C_{H2}^n}{(1+k_d C_{H2S})^2} = -ul\frac{dC_s}{dz}\left(\frac{\text{Mol}}{\text{Catalyst weight}*\text{time}}\right)$$

$$R_N = \frac{kC_N^m C_{H2}^n}{(1+k_{ds}C_{H2S}+k_{dn}C_{NH3}+k_{dA}C_A)^2} - ul\frac{dC_N}{dz}\left(\frac{\text{Mol}}{\text{Catalyst weight}*\text{time}}\right)$$

Hence, reduction in H₂S concentration in liquid phase corresponding to H₂S partial pressure in gas phase would improve desulfurization and denitrogenation rates and reduce catalyst requirement significantly. Radial flow of hydrogen will strip H₂S/NH₃ away from middle region, thus minimizing inhibitory effect by reduced competitive adsorption by product species and aromatics. Hydrogen and H₂S partial pressure profile of conventional diesel hydrotreating scheme is compared with the present subject matter with three radial flow stages. Inlet gas is distributed uniformly in all three stages of reactor 100 under operating conditions mentioned in table 1.

Table 3 tabulates the partial pressure of hydrogen and hydrogen sulphide at various inlets and outlets. Equal conversion in each stage is assumed and through representative desulfurization reaction stoichiometry, partial pressures of H₂ and H₂S have been calculated.

TABLE 3

Partial Pressures of Gases at outlet

| | | Convention trickle bed | | Reactor 100 | |
|---|---|---|---|---|---|
| Reactor Section | Inlet Pressure 45 bar | H2 Partial pressure bar | H2S Partial pressure Bar | H2 Partial pressure bar | H2S Partial pressure Bar |
| Bed 1 | Inlet | 45 | 0 | 45 | 0 |
| | Outlet | 42.3 | 2.7 | 42.3 | 2.7 |
| Bed 2 | Outlet | 41.9 | 3.1 | 44.6 | 0.4 |
| Bed 3 | Outlet | 41.8 | 3.2 | 44.9 | 0.1 |

As can be observed from table 2, whereas there is little difference in partial pressure of hydrogen between conventional trickle bed and reactor 100, the partial pressure of hydrogen sulphide is substantially reduced in the reactor 100. This leads to efficient hydroprocessing of the hydrocarbon feedstock 102 in reactor 100 at low severity operation.

In another example, significance of the reactor 100 is demonstrated through test result in hydrocracking process operating at 340-410° C. temperature, 15-2500 psi hydrogen partial pressure and 0.5 to 10 hr$^{-1}$ Weight Hourly Space Velocity. Yields of conventional gas oil hydrocracker have been compared with the reactor 100 unit in table 3. Results for the reactor 100 have been simulated from in house two-phase hydrocracker model. Vapor liquid equilibrium (VLE) has been calculated along the reactor. Reactants and products in hydrocracking reaction are separated into vapor and liquid phase as per VLE, radial flow of gas phase across catalyst separates vapor phase components and liquid continues to trickle down and hydrocracked to products. Light ends and fraction of middle distillates is separated along with hydrogen, which minimizes over cracking of middle distillates to light ends. Fraction of middle distillates, which vaporizes and is removed from middle region results in improved selectivity for middle distillates by minimizing secondary cracking to light ends. Efficient Gas-Liquid-Solid contacting due to radial flow in the reactor 100 resulted in increased middle distillate yield by approx. 7 wt % and reduction in naphtha yield by 5 wt %. Severity in radial flow hydrocracker would be lower compared to conventional for similar levels of conversion. Table 4 tabulates the results with common feed rate of 3384 tons per day and temperature of 355 Celsius for conventional and 351 Celsius for reactor 100, as under:

TABLE 4

| Component | Wt % yields | |
|---|---|---|
| | Conventional | Reactor 100 |
| Vapor and Gas Output | 39.7 | 38.0 |
| Middle Distillate | 40.1 | 47.0 |
| Naphtha | 17.8 | 12.7 |
| Gas | 2.4 | 2.3 |

Although implementations for method and system for hydroprocessing is described in language specific to structural features and/or methods, it is to be understood that the appended claims are not necessarily limited to the specific features or methods described. Rather, the specific features and methods are disclosed as examples and implementations for method and system of hydroprocessing.

We claim:

1. A cross-flow reactor enclosed in a shell for three phase catalytic hydroprocessing, the cross-flow reactor comprising at least one reactor stage, wherein the at least one reactor stage comprises:
   a central gas distributor having perforations on a lateral surface for distributing reactant gas into the cross-flow reactor, wherein the central gas distributor distributes the reactant gas through the perforations in a direction substantially tangential to a downward flowing liquid reactant, and wherein a base of the central gas distributor of a last reactor stage is bound by a non-porous support plate to prevent exit of the reactant gas from the base of the central gas distributor;
   a middle region for accommodating a packed catalyst bed and receiving the liquid reactant, the middle region being concentric to the central gas distributor, wherein the lateral surface of the central gas distributor forms an inner bound of the middle region and perforated support plates form an outer bound of the middle region, and wherein porous support plates form an upper and a lower bound of the middle region, and wherein the middle region is configured to allow a substantially vertically downward flow of the liquid reactant through the packed catalyst bed; and
   an outer gas space for removal of effluent gases from the middle region, the outer gas space being concentric to the middle region, wherein the perforated support plates form an inner bound of the outer gas space and the shell of the cross-flow reactor forms an outer bound of the outer gas space, and wherein non-porous support plates form an upper bound and a lower bound of the outer gas space, and wherein the outer gas space of each reactor stage includes an outlet provided on the shell of the cross-flow reactor to remove the effluent gases flowing in the direction substantially tangential to the downward flowing liquid reactant from the middle region of the respective reactor stage, and wherein a base of the outer gas space is bound by another non-porous support plate to prevent exit of the effluent gases from the base of the outer gas space.

2. The cross-flow reactor of claim 1, further comprising at least two reactor stages stacked vertically one over another, wherein each of the at least two reactor stages is separated from a next reactor stage by a liquid re-distributor.

3. The cross-flow reactor of claim 2, wherein the liquid re-distributor comprises:
   a middle annular re-distributor to re-distribute the liquid reactant from the middle region of each of the at least two reactor stages to the next reactor stage, wherein a non-perforated outer surface forms an inner bound of the middle annular re-distributor and non-perforated separator plates form an outer bound of the middle annular re-distributor, the non-perforated separator plates having an inlet for receiving recycle feed; and
   an outer recycle space for introduction of the recycle feed into the middle annular re-distributor, wherein the non-perforated separator plates form an inner bound of the outer recycle space and the shell of the cross-flow reactor forms an outer bound of the outer recycle space, and wherein non-porous support plates form an upper and a lower bound of the outer recycle space to prevent flow of the effluent gases from each of the at least one reactor stage to the next reactor stage.

4. The cross-flow reactor of claim 1, wherein effluent liquid is removed from a bottom of the middle region of a last reactor stage.

5. The cross-flow reactor of claim 1, wherein a density of perforations on the perforated surface of the central gas distributor and the perforated support plates varies over a length of the cross-flow reactor.

6. The cross-flow reactor of claim 1, wherein the catalyst bed comprises catalyst particles, and wherein sizes and shapes of the catalyst particles vary over a length of the cross-flow reactor.

7. The cross-flow reactor of claim 1 further comprising at least one co-current downward flow hydroprocessing reactor stage stacked below the at least one cross flow reacting stage.

8. The cross-flow reactor of claim 1, wherein the central gas distributor is one of cylindrical, hexagonal, elliptical, tapered cylindrical, tapered hexagonal, tapered elliptical, stepwise cylindrical, stepwise hexagonal, and stepwise elliptical in shape.

9. The cross flow reactor of claim 1, wherein at least one of reactant gas flow and liquid reactant flow is operated in a pulsing flow mode.

10. The cross-flow reactor of claim 1, wherein the central gas distributor has perforations on lateral surface of distributor at an acute angle to the lateral surface.

11. The cross-flow reactor of claim 1, wherein product gases are released at each stage of the at least one reactor stage of the reactor through the outer gas space.

12. A cross-flow reactor for three phase catalytic hydroprocessing, the cross-flow reactor comprising a plurality of reactor stages, wherein the at least one reactor stage comprises:
  at least one central gas distributor having at least one slit on a lateral surface for distributing reactant gas into the cross-flow reactor, wherein the central gas distributor is configured to distribute the reactant gas through the slit in a direction substantially tangential to a downward flowing liquid reactant, and wherein a base of the central gas distributor of a last reactor stage is bound by a non-porous support plate to prevent exit of the reactant gas from the base of the central gas distributor;
  a middle region for accommodating a packed catalyst bed that receives a liquid reactant, the middle region being concentric to the central gas distributor, wherein the lateral surface with at least one slit on the lateral surface of the central gas distributor forms an inner bound of the middle region and perforated support plates form an outer bound of the middle region, and wherein porous support plates form an upper and a lower bound of the middle region, and wherein the middle region is configured to allow a substantially vertically downward flow of the liquid reactant through the packed catalyst bed; and
  an outer gas space for removal of effluent gases from the middle region, the outer gas space being concentric to the middle region, wherein non-porous support plates form an upper bound and a lower bound of the outer gas space, and wherein the perforated support plates form an inner bound of the outer gas space and a shell of the cross-flow reactor forms an outer bound of the outer gas space, and wherein the outer gas space of each reactor stage includes an outlet provided on the shell of the cross-flow reactor to remove the effluent gases flowing in the direction substantially tangential to the downward flowing liquid reactant from the middle region of the respective reactor stage, and wherein a base of the outer gas space is bound by another non-porous support plate to prevent exit of the effluent gases from the base of the outer gas space.

13. The cross flow reactor of claim 12, further comprising at least one guiding vane on the at least one slit, and wherein the at least one guiding vane is at an acute angle to the lateral surface of the central gas distributor.

14. A cross-flow reactor for three phase catalytic hydroprocessing, the cross-flow reactor comprising at least one reactor stage, wherein the at least one reactor stage comprises:
  a plurality of gas distributors having a perforated lateral surface for distributing reactant gas into the cross-flow reactor having the perforated lateral surface for distributing reactant gas into the cross flow reactor, and wherein a base of each of the plurality of gas distributors of a last reactor stage is bound by a non-porous support plate to prevent exit of the reactant gas from the base;
  a middle region for accommodating a packed catalyst bed that receives a liquid reactant, wherein the perforated lateral surface of the each of the plurality of gas distributors forms an inner bound of the middle region (206) and perforated support plates form an outer bound of the middle region, and wherein the plurality of gas distributors are embedded in predetermined positions in the middle region, and wherein porous support plates form an upper and a lower bound of the middle region; and
  an outer gas space for movement of effluent gases from the middle region, the outer gas space being concentric to the middle region, wherein non-porous support plates form an upper bound and a lower bound of the outer gas space, and wherein the perforated support plates form an inner bound of the outer gas space and a shell of the cross-flow reactor forms an outer bound of the outer gas space, and wherein a base of the outer gas space is bound by another non-porous support plate to prevent exit of the effluent gases from the base of the outer gas space.

15. The cross-flow reactor of claim 14, wherein at least one gas distributor has perforations on lateral surface of distributor at an acute angle to lateral surface.

16. A method for three phase catalytic hydroprocessing using a cross-flow reactor having at least one reactor stage, the cross-flow reactor comprising at least one reactor stage, the method comprising:
  introducing hydrogen gas into a central gas distributor of the at least one reactor stage, the central gas distributor having perforations on a lateral surface for distributing hydrogen gas into the cross-flow reactor, wherein the central gas distributor distributes the hydrogen gas through the perforations in a direction substantially tangential to a downward flowing liquid hydrocarbon feedstock, and wherein a base of the central gas distributor of a last reactor stage is bound by a non-porous support plate to prevent exit of the hydrogen gas from the base of the central gas distributor;
  introducing the liquid hydrocarbon feedstock into a middle region of the at least one reactor stage wherein the middle region accommodates a packed catalyst bed, the middle region being concentric to the central gas distributor, wherein the lateral surface of the central gas distributor forms an inner bound of the middle region and perforated support plates form an outer bound of the middle region, and wherein porous support plates form an upper and a lower bound of the middle region, and wherein the middle region allows a substantially vertically downward flow of the liquid hydrocarbon feedstock through the packed catalyst bed; and
  releasing effluent gases from the middle region into an outer gas space, the outer gas space being concentric to the middle region, wherein the perforated support plates form an inner bound of the outer gas space and the shell of the cross-flow reactor forms an outer bound of the outer gas space, and wherein non-porous support plates form an upper bound and a lower bound of the outer gas space, and wherein the outer gas space of each reactor stage includes an outlet provided on the shell of the cross-flow reactor to remove the effluent gases flowing in the direction substantially tangential to the downward flowing liquid hydrocarbon feedstock from the middle region of the respective reactor stage and wherein a base of the outer gas space is bound by another non-porous support plate to prevent exit of the effluent gases from the base of the outer gas space.

17. The method of claim 16, wherein the hydrogen gas is introduced through a plurality of gas distributors embedded in predetermined positions in the middle region.

18. The method of claim 16, wherein operating temperature is from 310 to 410° C., operating pressure is between 100 psi to 2500 psi, gas to oil ratio is between 10 to 800 Nm3/m3, and liquid hourly space velocity is between from 0.5 hr$^{-1}$ to 10 hr$^{-1}$.

19. The method of claim 16, wherein at least one of gas and liquid flow rates are manipulated such that operating regime is induced pulsing flow.

* * * * *